United States Patent
Fukaya

(10) Patent No.: US 12,153,197 B2
(45) Date of Patent: Nov. 26, 2024

(54) IMAGING LENS COMPRISING SEVEN LENSES OF −+−−++−, −+−+++−, ++−−++−, ++−−+−− OR ++−−++− REFRACTIVE POWERS

(71) Applicant: TOKYO VISIONARY OPTICS CO., LTD., Tokyo (JP)

(72) Inventor: Hisao Fukaya, Sukagawa (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 106 days.

(21) Appl. No.: 17/391,840

(22) Filed: Aug. 2, 2021

(65) Prior Publication Data

US 2021/0364762 A1    Nov. 25, 2021

Related U.S. Application Data

(63) Continuation of application No. 16/654,754, filed on Oct. 16, 2019, now Pat. No. 11,169,363.

(30) Foreign Application Priority Data

Oct. 17, 2018    (JP) .................................. 2018-195773

(51) Int. Cl.
   G02B 13/00    (2006.01)
   G02B 9/64    (2006.01)

(52) U.S. Cl.
   CPC ........... *G02B 13/0045* (2013.01); *G02B 9/64* (2013.01)

(58) Field of Classification Search
   CPC .............................. G02B 13/0045; G02B 9/64
   See application file for complete search history.

(56) References Cited

U.S. PATENT DOCUMENTS

| | | |
|---|---|---|
| 2017/0227734 A1 | 8/2017 | Huang |
| 2019/0154974 A1* | 5/2019 | Chen ................... G02B 27/0037 |
| 2019/0179101 A1* | 6/2019 | Li ....................... G02B 13/0045 |
| 2019/0196144 A1* | 6/2019 | Chen ................... G02B 27/0025 |
| 2019/0367361 A1 | 12/2019 | Yoo et al. |

FOREIGN PATENT DOCUMENTS

| | | |
|---|---|---|
| CN | 206930824 U | 1/2018 |
| CN | 207181799 U | 4/2018 |
| CN | 108181701 A | 6/2018 |

* cited by examiner

*Primary Examiner* — Wen Huang
(74) *Attorney, Agent, or Firm* — Maine Cernota & Curran

(57) ABSTRACT

There is provided an imaging lens with excellent optical characteristics which satisfies demand of wide field of view, low profile and low F-number. An imaging lens comprises, in order from an object side to an image side, a first lens, an aperture stop, a second lens with positive refractive power in a paraxial region, a third lens with negative refractive power in the paraxial region, a fourth lens, a fifth lens with the positive refractive power in the paraxial region, a sixth lens being a double-sided aspheric lens, and a seventh lens with negative refractive power having an image-side surface being concave in the paraxial region and an aspheric surface having at least one pole point in a position off the optical axis.

6 Claims, 8 Drawing Sheets

IMAGING LENS COMPRISING SEVEN LENSES OF −+−−++−, −+−+++−, ++−−++−, ++−−+−− OR ++−−++− REFRACTIVE POWERS

The present application is based on and claims priority of a Japanese patent application No. 2018-195773 filed on Oct. 17, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in Patent Document 1 below has been known.

Patent Document 1 (US2017/0227734A) discloses an imaging lens comprising, in order from an object side, a first lens, a second lens, a third lens, a fourth lens, a fifth lens, a sixth lens, and a seventh lens, wherein the first lens has positive refractive power and an object-side surface being convex in a paraxial region, the second lens has negative refractive power, the sixth lens has at least one aspheric surface with at least one inflection point, and the seventh lens is a double-sided aspheric lens.

SUMMARY OF THE INVENTION

However, in lens configurations disclosed in the Patent Document 1, when wide field of view, low profile, and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low profile and the low F-number in well balance and excellently corrects aberrations.

Regarding terms used in the present invention, "a convex surface", "a concave surface" or "a plane surface" of lens surfaces implies that a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens, an aperture stop, a second lens with positive refractive power in a paraxial region, a third lens with negative refractive power in the paraxial region, a fourth lens, a fifth lens with the positive refractive power in the paraxial region, a sixth lens being a double-sided aspheric lens, and a seventh lens with negative refractive power having an image-side surface being concave in the paraxial region, wherein the image-side surface of the seventh lens is an aspheric surface having at least one pole point in a position off the optical axis.

The imaging lens having the above-described configuration is configured with a front group including the first lens to the third lens and a rear group including the fourth lens to the seventh lens. The front group of the lenses has positive composite refractive power, and achieves a low profile of the imaging lens and corrects spherical aberration and axial chromatic aberration. The rear group of the lenses corrects off-axial aberrations and controls a light ray incident angle to an image sensor.

The first lens controls the light ray incident angle to the peripheral area of the second lens and suppresses the spherical aberration occurring at the second lens. The second lens achieves reduction in the profile of the imaging lens by the positive refractive power. The third lens corrects the spherical aberration and chromatic aberration occurring at the second lens. The fourth lens corrects coma aberration and astigmatism in well balance. The fifth lens achieves reduction in the profile of the imaging lens by the positive refractive power and corrects the astigmatism and distortion. The sixth lens corrects the astigmatism and the distortion by aspheric surfaces formed on both sides of the sixth lens. The seventh lens has the image-side surface which is concave in the paraxial region and an aspheric surface having at least one pole point in a position off the optical axis, and corrects the distortion and controls the light ray incident angle to the image sensor.

When an aperture stop is arranging between the first lens and the second lens, lowering of a F-number is achieved and proper correction of lateral aberration is made.

According to the imaging lens having the above-described configuration, it is preferable that the first lens has a meniscus shape having a convex object-side surface in the paraxial region.

When the first lens has the meniscus shape having the convex object-side surface in the paraxial region, it becomes possible to suppress the spherical aberration occurring at the second lens.

According to the imaging lens having the above-described configuration, it is preferable that the second lens has a biconvex shape having convex object-side surface and image-side surface in the paraxial region.

When the second lens has the biconvex shape in the paraxial region, the positive refractive power becomes large and achieving reduction in the profile of the imaging lens is more facilitated. Furthermore, curvatures on both sides are suppressed from being large, and sensitivity to a manufacturing error can be reduced.

According to the imaging lens having the above-described configuration, it is preferable that the third lens has a convex object-side surface in the paraxial region.

When the third lens has the convex object-side surface in the paraxial region, the spherical aberration and the chromatic aberration occurring at the second lens can be properly corrected.

According to the imaging lens having the above-described configuration, it is preferable that the fourth lens is double-sided aspheric lens.

When the fourth lens is double-sided aspheric lens, the astigmatism and the coma aberration can be properly corrected.

According to the imaging lens having the above-described configuration, it is preferable that the fifth lens has a concave object-side surface and a convex image-side surface in the paraxial region, and is a double-sided aspheric lens.

When the object-side surface of the fifth lens is concave in the paraxial region and is an aspheric surface, a light ray incident angle to the object-side surface of the fifth lens can be controlled to be small, and field curvature can be properly corrected. Furthermore, when the image-side surface of the fifth lens is convex in the paraxial region and is an aspheric surface, the coma aberration, the astigmatism and the distortion can be properly corrected.

According to the imaging lens having the above-described configuration, it is preferable that the sixth lens has positive refractive power in the paraxial region. Furthermore, it is preferable that the sixth lens has a convex object-side surface and a concave image-side surface in the paraxial region When the refractive power of the sixth lens is positive in the paraxial region, achieving reduction in the profile of the imaging lens is facilitated.

When the object-side surface of the sixth lens is convex in the paraxial region, the coma aberration, the astigmatism occurring at the image-side surface, and the distortion can be properly corrected. Furthermore, when the image-side surface of the sixth lens is concave, the astigmatism and the distortion are prevented from occurring excessively.

According to the imaging lens having the above-described configuration, it is preferable that the aspheric surface of the object-side surface of the sixth lens has at least one pole point in a position off the optical axis.

When the object-side surface of the sixth lens is formed as the aspheric surface having at least one pole point in the position off the optical axis, the astigmatism and the distortion can be properly corrected.

According to the imaging lens having the above-described configuration, it is preferable that an object-side surface of the seventh lens is convex in the paraxial region and an aspheric surface having a pole point in a position off the optical axis.

When the object-side surface of the seventh lens is convex in the paraxial region and an aspheric surface having a pole point in a position off the optical axis, the distortion can be properly corrected and the light ray incident angle to the image sensor can be properly controlled.

According to the imaging lens having the above-described configuration, it is preferable that the following conditional expression (1) is satisfied:

$$40 < vd7 < 70 \tag{1}$$

where
vd7: an abbe number at d-ray of the seventh lens.

The conditional expression (1) defines an appropriate range of the abbe number at d-ray of the seventh lens. By using a material satisfying the conditional expression (1), chromatic aberration of magnification can be properly corrected.

According to the imaging lens having the above-described configuration, it is preferable that the following conditional expression (2) is satisfied:

$$TTL/ih < 2.0 \tag{2}$$

where
TTL: a total track length, and
Ih: a maximum image height.

The conditional expression (2) defines an appropriate range of a ratio of the total track length to the maximum image height. By satisfying the conditional expression (2), the imaging lens of which profile is satisfactorily reduced can be obtained.

According to the imaging lens having the above-described configuration, it is preferable that the following conditional expression (3) is satisfied:

$$1.50 < vd5/vd6 < 3.50 \tag{3}$$

where
vd5: an abbe number at d-ray of the fifth lens, and
vd6: an abbe number at d-ray of the sixth lens.

The conditional expression (3) defines a relationship between the abbe numbers at d-ray of the fifth lens and the sixth lens. By using a material satisfying the conditional expression (3), the chromatic aberration can be properly corrected.

According to the imaging lens having the above-described configuration, it is preferable that the following conditional expression (4) is satisfied:

$$0.30 < r2/f < 4.00 \tag{4}$$

where
r2: a paraxial curvature radius of an image-side surface of the first lens, and
f: a focal length of the overall optical system of the imaging lens.

The conditional expression (4) defines a paraxial shape of an image-side surface of the first lens. By satisfying the conditional expression (4), the spherical aberration can be properly corrected.

According to the imaging lens having the above-described configuration, it is preferable that the following conditional expression (5) is satisfied:

$$-0.90 < r9/f < 0 \tag{5}$$

where
r9: a paraxial curvature radius of an object-side surface of the fifth lens, and
f: a focal length of the overall optical system of the imaging lens.

The conditional expression (5) defines aa paraxial shape of the object-side surface of the fifth lens. By satisfying the conditional expression (5), the astigmatism and the coma aberration can be properly corrected.

According to the imaging lens having the above-described configuration, it is preferable that the following conditional expression (6) is satisfied:

$$0.20 < r14/f < 0.60 \tag{6}$$

where
r14: a paraxial curvature radius of an image-side surface of the seventh lens, and
f: a focal length of the overall optical system of the imaging lens.

The conditional expression (6) defines a paraxial shape of the image-side surface of the seventh lens. By satisfying the conditional expression (6), the astigmatism can be properly corrected while keeping the total track length short.

According to the imaging lens having the above-described configuration, it is preferable that the following conditional expression (7) is satisfied:

$$0.50<(T1/TTL)\times 100<1.20 \qquad (7)$$

where

T1: a distance along the optical axis from an image-side surface of the first lens to an object-side surface of the second lens, and TTL: a total track length.

The conditional expression (7) defines an appropriate range of a distance along the optical axis between the first lens and the second lens. By satisfying the conditional expression (7), aberrations can be properly corrected in well balance while achieving reduction in the profile of the imaging lens.

Furthermore, According to the imaging lens having the above-described configuration, the first lens has the negative or positive refractive power in the paraxial region.

When the refractive power of the first lens is negative, the it is preferable that the following conditional expression (8) is satisfied:

$$-8.00<f1/f<-2.30 \qquad (8)$$

where f1: a focal length of the first lens, and f: a focal length of the overall optical system of the imaging lens.

The conditional expression (8) defines an appropriate range of the negative refractive power of the first lens. By satisfying the conditional expression (8), the spherical aberration occurring at the second lens can be effectively suppressed, and excellent optical performance can be maintained.

When the refractive power of the first lens is positive, the it is preferable that the following conditional expression (9) is satisfied:

$$1.00<f1/f<2.20 \qquad (9)$$

where f1: a focal length of the first lens, and f: a focal length of the overall optical system of the imaging lens.

The conditional expression (9) defines an appropriate range of the positive refractive power of the first lens. By satisfying the conditional expression (9), the spherical aberration occurring at the second lens can be corrected, and achieving reduction in the profile of the imaging lens is facilitated.

According to the imaging lens having the above-described configuration, the it is preferable that the following conditional expression (10) is satisfied:

$$0.50<f2/f<1.90 \qquad (10)$$

where f2: a focal length of the second lens, and f: a focal length of the overall optical system of the imaging lens.

The conditional expression (10) defines an appropriate range of the refractive power of the second lens. When a value is below the upper limit of the conditional expression (10), the total track length can be shortened and achieving reduction in the profile of the imaging lens is facilitated. On the other hand, when the value is above the lower limit of the conditional expression (10), occurrence of the spherical aberration can be suppressed and excellent optical performance can be maintained.

According to the imaging lens having the above-described configuration, the it is preferable that the following conditional expression (11) is satisfied:

$$-5.30<f3/f<-1.30 \qquad (11)$$

where f3: a focal length of the third lens, and f: a focal length of the overall optical system of the imaging lens.

The conditional expression (11) defines an appropriate range of the refractive power of the third lens. By satisfying the conditional expression (11), the spherical aberration and axial chromatic aberration can be properly corrected.

According to the imaging lens having the above-described configuration, the it is preferable that the following conditional expression (12) is satisfied:

$$0.70<f5/f<2.50 \qquad (12)$$

where f5: a focal length of the fifth lens, and f: a focal length of the overall optical system of the imaging lens.

The conditional expression (12) defines an appropriate range of the refractive power of the fifth lens. By satisfying the conditional expression (12), the total track length can be shortened and achieving reduction in the profile of the imaging lens is facilitated.

Furthermore, thickness of an edge of the fifth lens is prevented from being excessively small, and the formability of the lens is improved.

According to the imaging lens having the above-described configuration, the it is preferable that the following conditional expression (13) is satisfied:

$$-2.00<f7/f<-0.70 \qquad (13)$$

where f7: a focal length of the seventh lens, and f: a focal length of the overall optical system of the imaging lens The conditional expression (13) defines an appropriate range of the refractive power of the seventh lens. By satisfying the conditional expression (13), a back focus can be appropriately secured while maintaining a low profile of the imaging lens. Furthermore, the light ray incident angle to the image sensor can be appropriately controlled.

According to the imaging lens having the above-described configuration, it is preferable that a below conditional expression (14) is satisfied:

$$-1.00<r3/r4<0.20 \qquad (14)$$

where r3: paraxial curvature radius of the object-side surface of the second lens, and r4: paraxial curvature radius of the image-side surface of the second lens.

The conditional expression (14) defines an appropriate range of paraxial curvature radii of the object-side surface and the image-side surface of the second lens. By satisfying the conditional expression (14), the sensitivity to a manufacturing error can be reduced and the spherical aberration can be properly suppressed.

According to the imaging lens having the above-described configuration, it is preferable that a below conditional expression (15) is satisfied:

$$1.10<r5/r6<2.50 \qquad (15)$$

where r5: paraxial curvature radius of the object-side surface of the third lens, and r6: paraxial curvature radius of the image-side surface of the third lens.

The conditional expression (15) defines an appropriate range of paraxial curvature radii of the object-side surface and the image-side surface of the third lens. By satisfying the conditional expression (15), the spherical aberration and the axial chromatic aberration can be easily corrected and the excellent optical performance can be maintained.

According to the imaging lens having the above-described configuration, it is preferable that a below conditional expression (16) is satisfied:

$$1.00 < r9/r10 < 2.40 \qquad (16)$$

where r9: paraxial curvature radius of the object-side surface of the fifth lens, and r10: paraxial curvature radius of the image-side surface of the fifth lens.

The conditional expression (16) defines an appropriate range of paraxial curvature radii of the object-side surface and the image-side surface of the fifth lens. By satisfying the conditional expression (16), the astigmatism can be easily corrected and the excellent optical performance can be maintained. Furthermore, thickness of the edge of the fifth lens can be easily secured.

According to the imaging lens having the above-described configuration, it is preferable that a below conditional expression (17) is satisfied:

$$-0.50 < r11/r12 < 5.00 \qquad (17)$$

where r11: paraxial curvature radius of the object-side surface of the sixth lens, and r12: paraxial curvature radius of the image-side surface of the sixth lens.

The conditional expression (17) defines an appropriate range of paraxial curvature radii of the object-side surface and the image-side surface of the sixth lens. By satisfying the conditional expression (17), the distortion and the astigmatism can be easily corrected and the excellent optical performance can be maintained.

According to the imaging lens having the above-described configuration, it is preferable that a below conditional expression (18) is satisfied:

$$1.5 < T3/T4 < 3.3 \qquad (18)$$

where

T3: a distance along the optical axis from an image-side surface of the third lens to an object-side surface of the fourth lens, and T4: a distance along the optical axis from an image-side surface of the fourth lens to an object-side surface of the fifth lens.

The conditional expression (18) defines an appropriate range of a distance between the third lens and the fourth lens and a distance between the fourth lens and the fifth lens.

By satisfying the conditional expression (18), the coma aberration, the astigmatism or the like can be properly corrected.

According to the imaging lens having the above-described configuration, it is preferable that the following conditional expression (19) is satisfied:

$$0.04 < D1/f < 0.08 \qquad (19)$$

where

D1: a thickness of the first lens along the optical axis, and f: a focal length of the overall optical system of the imaging lens.

The conditional expression (19) defines an appropriate range of a thickness of the first lens along the optical axis. When a value is below the upper limit of the conditional expression (19), the thickness of the first lens along the optical axis is suppressed from being too large, and achieving reduction in the profile can be more facilitated. On the other hand, when the value is above the lower limit of the conditional expression (19), the thickness of the first lens along the optical axis is suppressed from being too small, and the formability of the lens becomes excellent.

According to the imaging lens having the above-described configuration, it is preferable that the following conditional expression (20) is satisfied:

$$0.06 < D5/f < 0.18 \qquad (20)$$

where

D5: a thickness of the fifth lens along the optical axis, and f: a focal length of the overall optical system of the imaging lens.

The conditional expression (20) defines an appropriate range of a thickness of the fifth lens along the optical axis. When a value is below the upper limit of the conditional expression (20), the thickness of the fifth lens along the optical axis is suppressed from being too large, and achieving reduction in the profile can be more facilitated. On the other hand, when the value is above the lower limit of the conditional expression (20), the thickness of the fifth lens along the optical axis is suppressed from being too small, and the formability of the lens becomes excellent.

According to the imaging lens having the above-described configuration, it is preferable that a below conditional expression (21) is satisfied:

$$0.07 < D6/f < 0.15 \qquad (21)$$

where

D6: a thickness of the sixth lens along the optical axis, and f: a focal length of the overall optical system of the imaging lens.

The conditional expression (21) defines an appropriate range of a thickness of the sixth lens along the optical axis. When a value is below the upper limit of the conditional expression (21), the thickness of the sixth lens along the optical axis is suppressed from being too large, and achieving reduction in the profile can be more facilitated. On the other hand, when the value is above the lower limit of the conditional expression (21), the thickness of the sixth lens along the optical axis is suppressed from being too small, and the formability of the lens becomes excellent.

According to the imaging lens having the above-described configuration, it is preferable that a below conditional expression (22) is satisfied:

$$0.11 < (Sag2F + Sag3R - Sag4F)/f < 0.30 \qquad (22)$$

where

Sag2F: an amount of sag at a peripheral area of the effective diameter on the object-side surface of the second lens, Sag3R: an amount of sag at a peripheral area of the effective diameter on the image-side surface of the third lens, Sag4F: an amount of sag at a peripheral area of the effective diameter on the object-side surface of the fourth lens, and f: a focal length of the overall optical system of the imaging lens.

The Conditional expression (22) defines a relationship among amounts of sag at the peripheral areas of the effective diameters on the object-side surface of the second lens, the image-side surface of the third lens and the object-side surface of the fourth lens. By satisfying the conditional expression (22), the spherical aberration can be easily corrected and the excellent optical performance can be maintained.

According to the imaging lens having the above-described configuration, it is preferable that the following conditional expression (23) is satisfied:

$$TTL/EPD \leq 2.6 \qquad (23)$$

where

EPD: an entrance pupil diameter, and

TTL: a total track length.

The conditional expression (23) defines a relationship between the total track length and the entrance pupil diameter. By satisfying the conditional expression (23), the total track length can be shortened, decrease in light quantity at the peripheral area can be suppressed and an image having sufficient brightness from a center to a peripheral area can be obtained.

According to the imaging lens having the above-described configuration, it is preferable that the following conditional expression (24) is satisfied:

$$0.12 < Bf/TTL < 0.28 \qquad (24)$$

where

Bf: a back focus, and

TTL: a total track length.

The conditional expression (24) defines a relationship between the total track length and the back focus. By satisfying the conditional expression (24), reduction in the profile of the imaging lens can be achieved while securing the appropriate back focus.

According to the imaging lens having the above-described configuration, it is preferable that the following conditional expression (25) is satisfied:

$$0.04 < (T1+T2)/\Sigma 13d < 0.12 \qquad (25)$$

where

T1: a distance along the optical axis from an image-side surface of the first lens to an object-side surface of the second lens, T2: a distance along the optical axis from an image-side surface of the second lens to an object-side surface of the third lens, and $\Sigma 13d$: a distance along the optical axis from an object-side surface of the first lens to an image-side surface of the third lens.

The conditional expression (25) defines a relationship of the distance along the optical axis from the first lens to the third lens. By satisfying the conditional expression (25), the total track length can be shortened, decrease in light quantity at the peripheral area can be suppressed and an image having sufficient brightness from a center to a peripheral area can be obtained.

According to the imaging lens having the above-described configuration, it is preferable that composite refractive power of the first lens, the second lens and the third lens is positive, and more preferable that the following conditional expression (26) is satisfied:

$$0.80 < f123/f < 1.50 \qquad (26)$$

where f123: a composite focal length of the first lens, the second lens and the third lens, and f: a focal length of the overall optical system of the imaging lens.

When the composite refractive power of the first lens, the second lens and the third lens is positive, reduction in the profile can be achieved and the spherical aberration and the axial chromatic aberration can be properly corrected.

The conditional expression (26) defines an appropriate range of the composite refractive power of the first lens, the second lens and the third lens. By satisfying the conditional expression (26), the spherical aberration and the axial chromatic aberration can be properly corrected while achieving reduction in the profile of the imaging lens.

Effect of Invention

According to the present invention, there can be provided an imaging lens with high resolution which satisfies demand of the wide field of view, the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11 and 13 are schematic views of the imaging lenses in Examples 1 to 7 according to the embodiments of the present invention, respectively.

Figure 1:
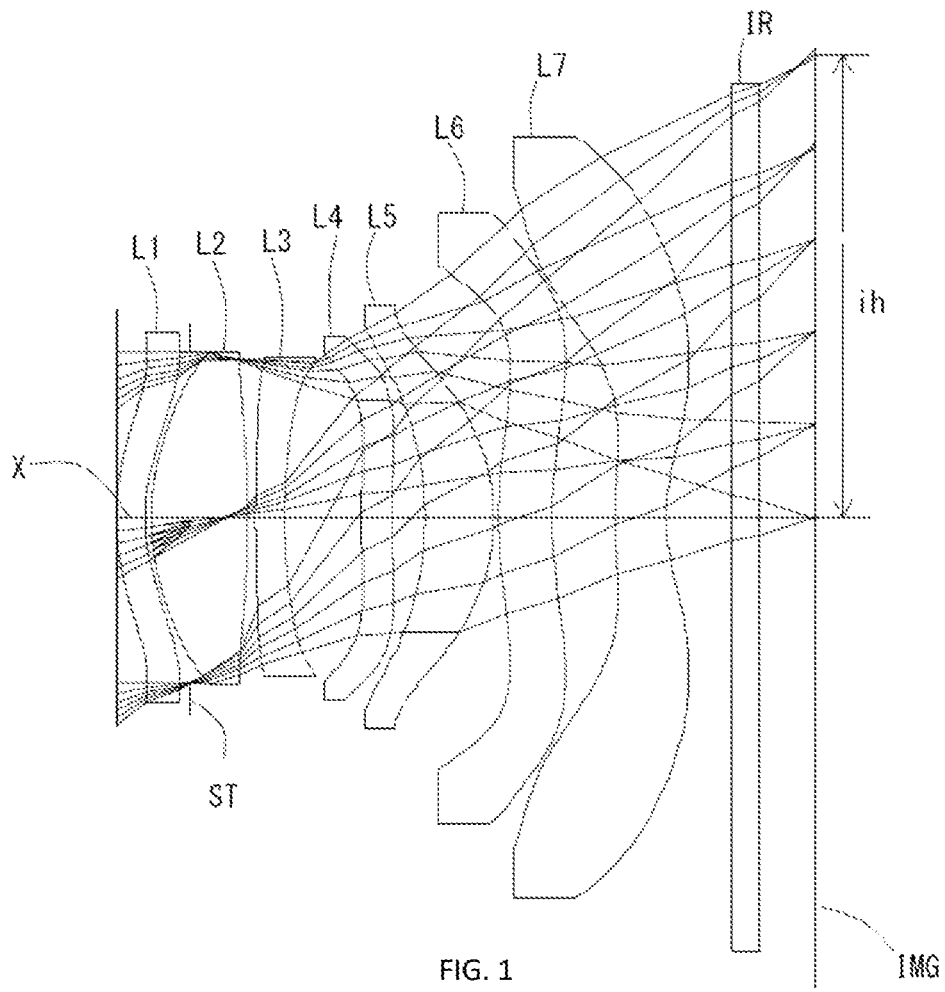
FIG. 1 is a schematic view showing an imaging lens in Example 1 according to the present invention.

As shown in FIG. 1, the imaging lens according to the present embodiment comprises, in order from an object side to an image side, a first lens L1, an aperture stop ST, a second lens L2 with positive refractive power in a paraxial region, a third lens L3 with negative refractive power in the paraxial region, a fourth lens L4, a fifth lens L5 with the positive refractive power in the paraxial region, a sixth lens L6 being a double-sided aspheric lens, and a seventh lens L7 with negative refractive power having an image-side surface being concave in the paraxial region, wherein the image-side surface of the seventh lens L7 is an aspheric surface having at least one pole point in a position off the optical axis X.

A filter IR such as an IR cut filter and a cover glass are arranged between the seventh lens L7 and an image plane IMG (namely, the image plane of an image sensor). The filter IR is omissible.

By arranging an aperture stop ST between the first lens L1 and the second lens L2, lowering of a F-number is achieved and lateral aberration is properly corrected.

The first lens L1 has negative refractive power in the paraxial region. A shape of the first lens L1 in the paraxial region is a meniscus shape having a convex object-side surface and a concave image-side surface. Therefore, spherical aberration occurring at the second lens L2 is suppressed.

The object-side surface of the first lens L1 is formed as an aspheric surface having at least one pole point in a position off the optical axis X. Thereby, a light ray incident angle to a peripheral area of the second lens L2 is controlled and the spherical aberration can be easily suppressed.

Examples 1, 2, 3 and 4 shows that the refractive power of the first lens L1 is negative, and Examples 5, 6 and 7 shows that the refractive power of the first lens L1 is positive.

When the refractive power of the first lens L1 is negative, the spherical aberration occurring at the second lens L2 can be effectively suppressed. On the other hand, when the refractive power of the first lens L1 is positive, reduction in profile can be easily achieved while suppressing the spherical aberration occurring at the second lens L2.

The second lens L2 has positive refractive power in the paraxial region. A shape of the second lens L2 in the paraxial region is a biconvex shape having convex object-side and image-side surfaces. Therefore, sensitivity to a manufacturing error can be reduced and reduction in the profile can be achieved.

The image-side surface of the second lens L2 may be concave in the paraxial region. In this case, sensitivity to a manufacturing error can be more reduced, and mass productivity can be enhanced.

The third lens L3 has the negative refractive power in the paraxial region. The third lens L3 has a convex object-side surface and a concave image-side surface. Therefore, the spherical aberration and chromatic aberration occurring at the second lens L2 can be properly corrected.

The image-side surface of the third lens L3 is formed in a shape which is entirely concave facing the image side. Thereby, a light ray of the peripheral area entering the fourth lens L4 is made to have a small incident angle.

The fourth lens L4 has the negative refractive power in the paraxial region. The fourth lens L4 has a convex object-side surface and a concave image-side surface. the refractive power of the fourth lens L4 is made to be the weakest among the seven lenses of the imaging lens. Therefore, coma aberration and astigmatism can be corrected in well balance while maintaining the low profile.

The fourth lens L4 is formed as a double-sided aspheric lens. The object-side surface is convex in the paraxial region and changes to concave at the peripheral area facing the object side. The image-side surface is concave in the paraxial region and changes to convex at the peripheral area facing the image side. That is, the fourth lens L4 is formed in a meniscus shape having the convex object-side surface in the paraxial region, and changes to the meniscus shape having the concave object-side surface at the peripheral area. Thereby, a light ray of the peripheral area entering the fifth lens L5 is made to have a small incident angle.

The fifth lens L5 has the positive refractive power in the paraxial region. The fifth lens L5 has a concave object-side surface and a convex image-side surface, and both-side surfaces are formed as aspheric surfaces. Therefore, the astigmatism and distortion can be properly corrected while achieving reduction in the profile.

The sixth lens L6 has the positive refractive power in the paraxial region. The sixth lens L6 has a convex object-side surface and a concave image-side surface. The both-side surfaces are formed as aspheric surfaces and the object-side surface has at least one pole point. Therefore, the astigmatism and distortion can be properly corrected.

The sixth lens L6 may have negative refractive power as in the Example 6. Furthermore, the image-side surface of the sixth lens L6 may be convex in the paraxial region as in the Examples 5 and 7. When both-side surfaces in the paraxial region is convex, curvatures are suppressed from being large, and sensitivity to a manufacturing error can be reduced.

The seventh lens L7 has the negative refractive power in the paraxial region. The seventh lens L7 has a convex object-side surface and a concave image-side surface. The both-side surfaces are formed as aspheric surfaces and have at least one pole point. Therefore, the distortion can be properly corrected and a light ray incident angle to an image sensor can be properly controlled.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

Furthermore, regarding the imaging lens according to the present embodiments, a flare stop may be arranged between the lenses other than the aperture stop ST. When the low F-number is to be achieved, it becomes difficult to correct off-axial aberration, especially the coma aberration. In order to solve such a problem, the flare stop may be arranged other than the aperture stop ST, and the coma aberration can be suppressed by shielding a part of a light ray around a maximum image height. The Examples 3 and 4 show that the flare stop is arranged between the third lens L3 and the fourth lens L4, and the low F-number of about 1.5 is achieved and excellent optical performance can be obtained.

The imaging lens according to the present embodiments shows preferable effect by satisfying the following conditional expressions (1) to (26).

$$40 < vd7 < 70 \tag{1}$$

$$TTL/ih < 2.0 \tag{2}$$

$$1.50 < vd5/vd6 < 3.50 \tag{3}$$

$$0.30 < r2/f < 4.00 \tag{4}$$

$$-0.90 < r9/f < 0 \tag{5}$$

$$0.20 < r14/f < 0.60 \tag{6}$$

$$0.50 < (T1/TTL) \times 100 < 1.20 \tag{7}$$

$$-8.00 < f1/f < -2.30 \tag{8}$$

$$1.00 < f1/f < 2.20 \tag{9}$$

$$0.50 < f2/f < 1.90 \tag{10}$$

$$-5.30 < f3/f < -1.30 \tag{11}$$

$$0.70 < f5/f < 2.50 \tag{12}$$

$$-2.00 < f7/f < -0.70 \tag{13}$$

$$-1.00 < r3/r4 < 0.20 \tag{14}$$

$$1.10 < r5/r6 < 2.50 \tag{15}$$

$$1.00 < r9/r10 < 2.40 \tag{16}$$

$$-0.50 < r11/r12 < 5.00 \tag{17}$$

$$1.5 < T3/T4 < 3.3 \tag{18}$$

$$0.04 < D1/f < 0.08 \tag{19}$$

$$0.06 < D5/f < 0.18 \tag{20}$$

$$0.07 < D6/f < 0.15 \tag{21}$$

$$0.11 < (Sag2F + Sag3R - Sag4F)/f < 0.30 \tag{22}$$

$$TTL/EPD \leq 2.6 \tag{23}$$

$$0.12 < Bf/TTL < 0.28 \tag{24}$$

$$0.04 < (T1+T2)/\Sigma 13d < 0.12 \tag{25}$$

$$0.80 < f123/f < 1.50 \tag{26}$$

where
TTL: a total track length,
f: a focal length of the overall optical system of the imaging lens,
f1: a focal length of the first lens L1,
f2: a focal length of the second lens L2,
f3: a focal length of the third lens L3,
f5: a focal length of the fifth lens L5,
f7: a focal length of the seventh lens L7,
f123: a composite focal length of the first lens L1, the second lens L2 and the third lens L3,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r5: a paraxial curvature radius of an object-side surface of the third lens L3,
r6: a paraxial curvature radius of an image-side surface of the third lens L3,
r9: a paraxial curvature radius of an object-side surface of the fifth lens L5,
r10: a paraxial curvature radius of an image-side surface of the fifth lens L5,
r11: a paraxial curvature radius of an object-side surface of the sixth lens L6,
r12: a paraxial curvature radius of an image-side surface of the sixth lens L6,
r14: a paraxial curvature radius of an image-side surface of the seventh lens L7,
D1: a thickness along the optical axis X of the first lens L1,
D5: a thickness along the optical axis X of the fifth lens L5,
D6: a thickness along the optical axis X of the sixth lens L6,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T3: a distance along the optical axis X from an image-side surface of the third lens L3 to an object-side surface of the fourth lens L4,
T4: a distance along the optical axis X from an image-side surface of the fourth lens L4 to an object-side surface of the fifth lens L5,
$\Sigma 13d$: a distance along the optical axis X from an object-side surface of the first lens L1 to an image-side surface of the third lens L3,
vd5: an abbe number at d-ray of the fifth lens L5,
vd6: an abbe number at d-ray of the sixth lens L6,
vd7: an abbe number at d-ray of the seventh lens L7,
Sag2F: an amount of sag at a peripheral area of the effective diameter on the object-side surface of the second lens L2,
Sag3R: an amount of sag at a peripheral area of the effective diameter on the image-side surface of the third lens L3,
Sag4F: an amount of sag at a peripheral area of the effective diameter on the object-side surface of the fourth lens L4,
Bf: a back focus,
EPD: an entrance pupil diameter, and
Ih: a maximum image height.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (26a).

$$40 < vd7 < 60 \tag{1a}$$

$$TTL/ih < 1.75 \tag{2a}$$

$$1.8 < vd5/vd6 < 2.8 \tag{3a}$$

$$0.30 < r2/f < 3.7 \tag{4a}$$

$$-0.75 < r9/f < 0 \tag{5a}$$

$$0.25 < r14/f < 0.53 \tag{6a}$$

$$0.55 < (T1/TTL) \times 100 < 1.00 \tag{7a}$$

$$-5.00 < f1/f < -2.80 \tag{8a}$$

$$1.20 < f1/f < 2.00 \tag{9a}$$

$$0.63 < f2/f < 1.70 \tag{10a}$$

$$-4.90 < f3/f < -1.55 \tag{11a}$$

$$0.85 < f5/f < 2.20 \tag{12a}$$

$$-1.80 < f7/f < -0.80 \tag{13a}$$

$$-0.85 < r3/r4 < 0.10 \tag{14a}$$

$$1.50 < r5/r6 < 2.40 \tag{15a}$$

$$1.30 < r9/r10 < 2.20 \tag{16a}$$

$$-0.32 < r11/r12 < 4.50 \tag{17a}$$

$$1.8 < T3/T4 < 3.0 \tag{18a}$$

$$0.04 < D1/f < 0.07 \tag{19a}$$

$$0.08 < D5/f < 0.17 \tag{20a}$$

$$0.07 < D6/f < 0.13 \tag{21a}$$

$$0.12 < (Sag2F + Sag3R - Sag4F)/f < 0.27 \tag{22a}$$

$$TTL/EPD \leq 2.40 \tag{23a}$$

$$0.14 < Bf/TTL < 0.26 \tag{24a}$$

$$0.05 < (T1+T2)/\Sigma 13d < 0.11 \tag{25a}$$

$$1.00 < f123/f < 1.35 \tag{26a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes paraxial curvature radius, k denotes a conic constant, and A4, A6, A8, A10, A12, A14 and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{[Equation 1]}$$

Next, examples of the imaging lens according to this embodiment will be explained. In each example, f denotes the focal length of the overall optical system of the imaging lens, Fno denotes an F-number, w denotes a half field of view, ih denotes a maximum image height, and TTL denotes a total track length. Additionally, i denotes surface number counted from the object side, r denotes the paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1

Unit mm f = 4.20
Fno = 1.67
ω(°) = 39.5
ih = 3.53
TTL = 5.23

Surface Data

| i (Object) | r Infinity | d Infinity | Nd | vd |
|---|---|---|---|---|
| 1* | 1.8442 | 0.2200 | 1.650 | 21.54 (vd1) |
| 2* | 1.4456 | 0.3443 | | |
| 3 (Stop) | Infinity | −0.3000 | | |
| 4* | 1.6917 | 0.7293 | 1.544 | 55.57 (vd2) |
| 5* | −24.9877 | 0.0630 | | |
| 6* | 7.7560 | 0.2200 | 1.671 | 19.24 (vd3) |
| 7* | 4.1526 | 0.5819 | | |
| 8* | 6.0081 | 0.2300 | 1.671 | 19.24 (vd4) |
| 9* | 5.4895 | 0.2533 | | |
| 10* | −2.5634 | 0.5225 | 1.544 | 55.57 (vd5) |
| 11* | −1.6332 | 0.0346 | | |

TABLE 1-continued

Example 1

| | | | | |
|---|---|---|---|---|
| 12* | 3.5220 | 0.4069 | 1.650 | 21.54 (vd6) |
| 13* | 3.8138 | 0.4734 | | |
| 14* | 2.9822 | 0.3903 | 1.544 | 55.57 (vd7) |
| 15* | 1.3432 | 0.5000 | | |
| 16 | Infinity | 0.2100 | 1.517 | 64.20 |
| 17 | Infinity | 0.4235 | | |
| | Image Plane | | | |

Constituent Lens Data

| Lens | Start Surface | Focal Length | Composite Focal Length | | Sag at Peripheral Area of Effective Diameter | |
|---|---|---|---|---|---|---|
| 1 | 1 | −13.146 | f123 | 5.148 | Sag2F | 0.438 |
| 2 | 4 | 2.942 | Entrance Pupil Diameter | | Sag3R | 0.233 |
| 3 | 6 | −13.661 | EPD | 2.518 | Sag4F | −0.282 |
| 4 | 8 | −115.367 | Back Focus | | | |
| 5 | 10 | 6.909 | Bf | 1.062 | | |
| 6 | 12 | 45.674 | | | | |
| 7 | 14 | −4.906 | | | | |

Aspheric Surface Data

| | First Surface | Second Surface | Fourth Surface | Fifth Surface | Sixth Surface | Seventh Surface | Eighth Surface |
|---|---|---|---|---|---|---|---|
| k | −1.512462E+00 | −2.696217E+00 | −2.048987E+00 | −4.624037E+00 | −9.000000E+01 | −2.792976E+01 | −2.024293E+01 |
| A4 | −3.769311E−02 | −5.781236E−02 | −3.824467E−02 | −1.169641E−01 | −1.371452E−01 | −1.524932E−02 | −1.600042E−01 |
| A6 | −2.687532E−02 | −3.469990E−02 | −6.472494E−03 | 1.737653E−01 | 2.611253E−01 | 6.655095E−02 | 1.216079E−01 |
| A8 | 2.861735E−02 | 6.281952E−02 | 6.435331E−02 | −1.268222E−01 | −1.985411E−01 | 2.683556E−02 | −2.538709E−01 |
| A10 | −3.444884E−02 | −5.661115E−02 | −3.985514E−02 | 4.679487E−02 | 4.718071E−02 | −1.124636E−01 | 2.221389E−01 |
| A12 | 1.695425E−02 | 2.329390E−02 | 8.476109E−03 | −3.468526E−03 | 2.332792E−02 | 9.130266E−02 | −9.405877E−02 |
| A14 | −2.772632E−03 | −3.501283E−03 | 0.000000E+00 | −1.418987E−03 | −1.103517E−02 | −2.214362E−02 | 1.780846E−04 |
| A16 | 0.000000E+00 | 0.000000E+00 | 0.000000E+00 | 0.000000E+00 | 0.000000E+00 | 0.000000E+00 | 9.655662E−03 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −8.770019E+00 | −7.116551E+00 | −6.824937E−01 | −4.426343E+01 | −6.432015E−01 | −1.615848E−01 | −4.685195E+00 |
| A4 | −1.376013E−01 | −9.003371E−02 | −1.176524E−01 | 6.263895E−02 | 3.669087E−03 | −2.937693E−01 | −1.589045E−01 |
| A6 | 5.708366E−02 | 9.042171E−02 | 2.414338E−01 | −1.179772E−01 | −8.433131E−02 | 1.151246E−01 | 7.584751E−02 |
| A8 | −5.833309E−02 | −9.573837E−02 | −3.581478E−01 | 7.417268E−02 | 6.250146E−02 | −3.408168E−02 | −2.500930E−02 |
| A10 | −9.782013E−03 | 4.885178E−02 | 3.111111E−01 | −2.543072E−02 | −2.477700E−02 | 8.840100E−03 | 5.419496E−03 |
| A12 | 3.753540E−02 | −8.413861E−03 | −1.506804E−01 | 3.637693E−03 | 5.317580E−03 | −1.581898E−03 | −7.174241E−04 |
| A14 | −2.204011E−02 | 0.000000E+00 | 3.907855E−02 | −9.475647E−05 | −5.726322E−04 | 1.557089E−04 | 5.177881E−05 |
| A16 | 4.736042E−03 | 0.000000E+00 | −4.194083E−03 | −7.446268E−06 | 2.407950E−05 | −6.307818E−06 | −1.554817E−06 |

The imaging lens in Example 1 satisfies conditional expressions (1) to (8), and (10) to (26) as shown in Table 8.

Figure 2:
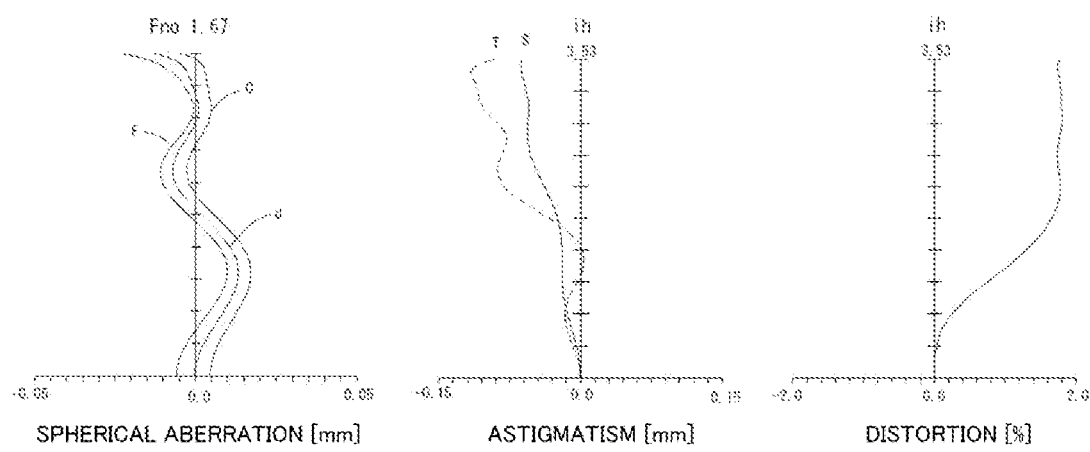
FIG. 2 shows spherical aberration, astigmatism, and distortion of the imaging lens in Example 1 according to the present invention.
Figure 3:
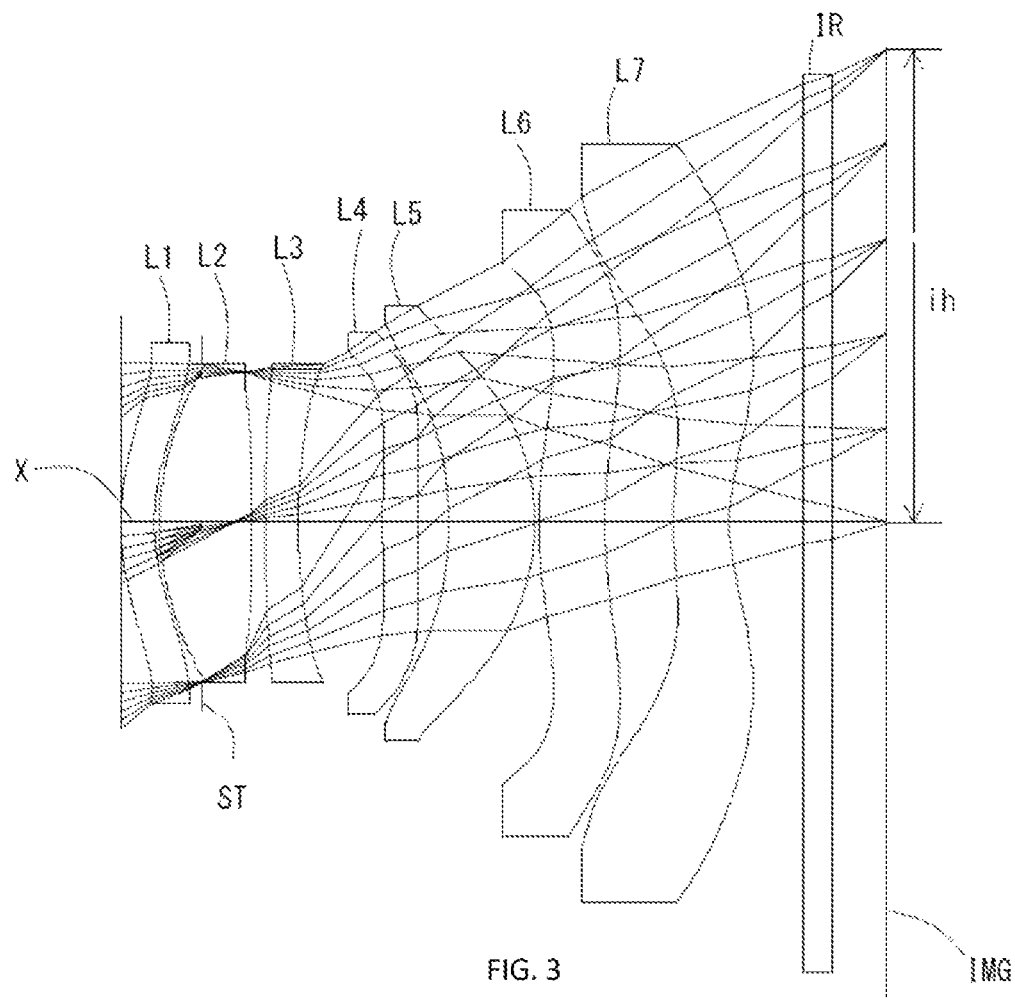
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12 and 14). As shown in FIG. 2, each aberration is corrected excellently.

Example 2

The basic lens data is shown below in Table 2.

TABLE 2

Example 2

Unit mm f = 4.09
Fno = 1.84
ω(°) = 38.3
ih = 3.28
TTL = 5.22

Surface Data

| i (Object) | r Infinity | d Infinity | Nd | vd |
|---|---|---|---|---|
| 1* | 1.8914 | 0.2300 | 1.650 | 21.54 (vd1) |
| 2* | 1.4720 | 0.3341 | | |
| 3 (Stop) | Infinity | −0.3000 | | |

TABLE 2-continued

| | | | Example 2 | | | |
|---|---|---|---|---|---|---|
| 4* | 1.7078 | 0.6441 | 1.544 | 55.57 (vd2) | | |
| 5* | −23.0695 | 0.0882 | | | | |
| 6* | 6.4916 | 0.2300 | 1.671 | 19.24 (vd3) | | |
| 7* | 3.8094 | 0.5846 | | | | |
| 8* | 7.4957 | 0.2400 | 1.671 | 19.24 (vd4) | | |
| 9* | 7.6279 | 0.2161 | | | | |
| 10* | −2.4626 | 0.5945 | 1.544 | 55.57 (vd5) | | |
| 11* | −1.6431 | 0.0296 | | | | |
| 12* | 3.5532 | 0.4551 | 1.650 | 21.54 (vd6) | | |
| 13* | 3.9304 | 0.4717 | | | | |
| 14* | 2.8688 | 0.3890 | 1.635 | 23.97 (vd7) | | |
| 15* | 1.4043 | 0.5000 | | | | |
| 16 | Infinity | 0.2100 | 1.517 | 64.20 | | |
| 17 | Infinity | 0.3770 | | | | |

Image Plane

Constituent Lens Data

| Lens | Start Surface | Focal Length | Composite Focal Length | | Sag at Peripheral Area of Effective Diameter | |
|---|---|---|---|---|---|---|
| 1 | 1 | −13.024 | f123 | 5.138 | Sag2F | 0.321 |
| 2 | 4 | 2.951 | Entrance Pupil Diameter | | Sag3R | 0.170 |
| 3 | 6 | −14.236 | EPD | 2.223 | Sag4F | −0.246 |
| 4 | 8 | 373.020 | Back Focus | | | |
| 5 | 10 | 7.231 | Bf | 1.015 | | |
| 6 | 12 | 38.582 | | | | |
| 7 | 14 | −4.831 | | | | |

Aspheric Surface Data

| | First Surface | Second Surface | Fourth Surface | Fifth Surface | Sixth Surface | Seventh Surface | Eighth Surface |
|---|---|---|---|---|---|---|---|
| k | −1.750671E+00 | −2.639549E+00 | −1.981018E+00 | −7.124830E+01 | −9.000000E+01 | −3.997755E+01 | −4.462156E+00 |
| A4 | −3.912995E−02 | −5.921848E−02 | −3.697590E−02 | −1.151740E−01 | −1.365084E−01 | −1.094802E−02 | −1.526816E−01 |
| A6 | −2.612766E−02 | −3.634938E−02 | −4.716791E−03 | 1.720416E−01 | 2.620760E−01 | 7.103608E−02 | 1.218295E−01 |
| A8 | 2.851548E−02 | 6.281154E−02 | 6.396635E−02 | −1.275162E−01 | −1.991402E−01 | 2.406121E−02 | −2.552584E−01 |
| A10 | −3.451114E−02 | −5.662319E−02 | −4.043718E−02 | 4.763531E−02 | 4.604655E−02 | −1.143001E−01 | 2.197867E−01 |
| A12 | 1.697232E−02 | 2.313664E−02 | 8.726069E−03 | −2.386024E−03 | 2.276316E−02 | 9.110651E−02 | −9.469029E−02 |
| A14 | −2.794280E−03 | −3.580073E−03 | 0.000000E+00 | −1.723274E−03 | −1.032304E−02 | −2.185041E−02 | 1.351945E−04 |
| A16 | 0.000000E+00 | 0.000000E+00 | 0.000000E+00 | 0.000000E+00 | 0.000000E+00 | 0.000000E+00 | 9.849913E−03 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −6.729495E+00 | −3.797828E+00 | −6.331515E−01 | −4.242392E+01 | −6.548326E−02 | −1.782668E−01 | −5.093506E+00 |
| A4 | −1.369489E−01 | −9.536391E−02 | −1.204918E−01 | 6.841911E−02 | 4.710751E−03 | −2.939513E−01 | −1.585272E−01 |
| A6 | 5.998043E−02 | 9.152542E−02 | 2.396810E−01 | −1.191970E−01 | −8.398765E−02 | 1.151253E−01 | 7.590035E−02 |
| A8 | 5.736802E−02 | −9.401960E−02 | −3.591250E−01 | 7.433897E−02 | 6.253215E−02 | −3.407465E−02 | −2.500785E−02 |
| A10 | −1.041250E−02 | 4.961492E−02 | 3.105713E−01 | −2.532388E−02 | −2.477700E−02 | 8.840100E−03 | 5.419369E−03 |
| A12 | 3.692116E−02 | −8.481193E−03 | −1.508265E−01 | 3.657082E−03 | 5.317674E−03 | −1.581511E−03 | −7.174275E−04 |
| A14 | −2.203984E−02 | 0.000000E+00 | 3.909190E−02 | −9.968306E−05 | −5.727238E−04 | 1.557217E−04 | 5.179177E−05 |
| A16 | 5.156377E−03 | 0.000000E+00 | −4.155029E−03 | −1.022505E−05 | 2.403267E−05 | −6.327736E−06 | −1.551165E−06 |

The imaging lens in Example 2 satisfies conditional expressions (2) to (8), and (10) to (26) as shown in Table 8.

Figure 4:
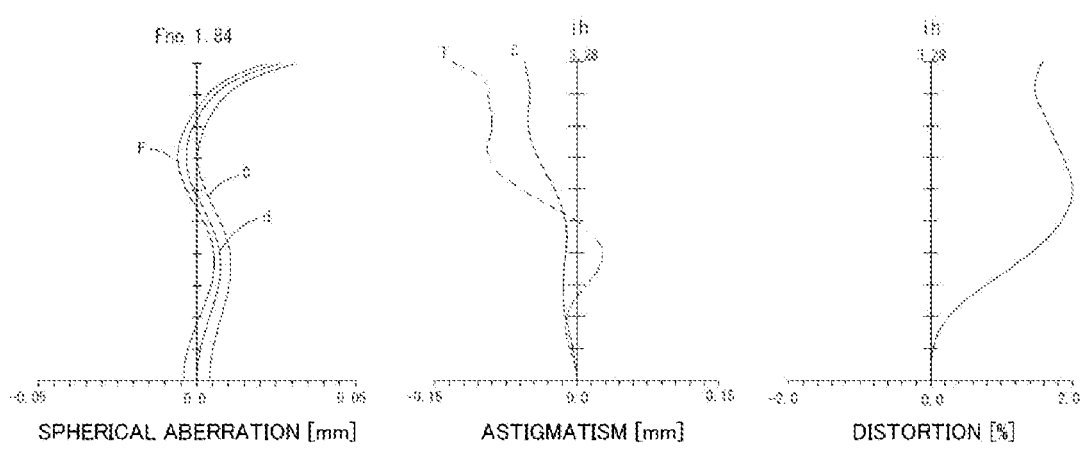
FIG. 4 shows spherical aberration, astigmatism, and distortion of the imaging lens in Example 2 according to the present invention.
Figure 5:
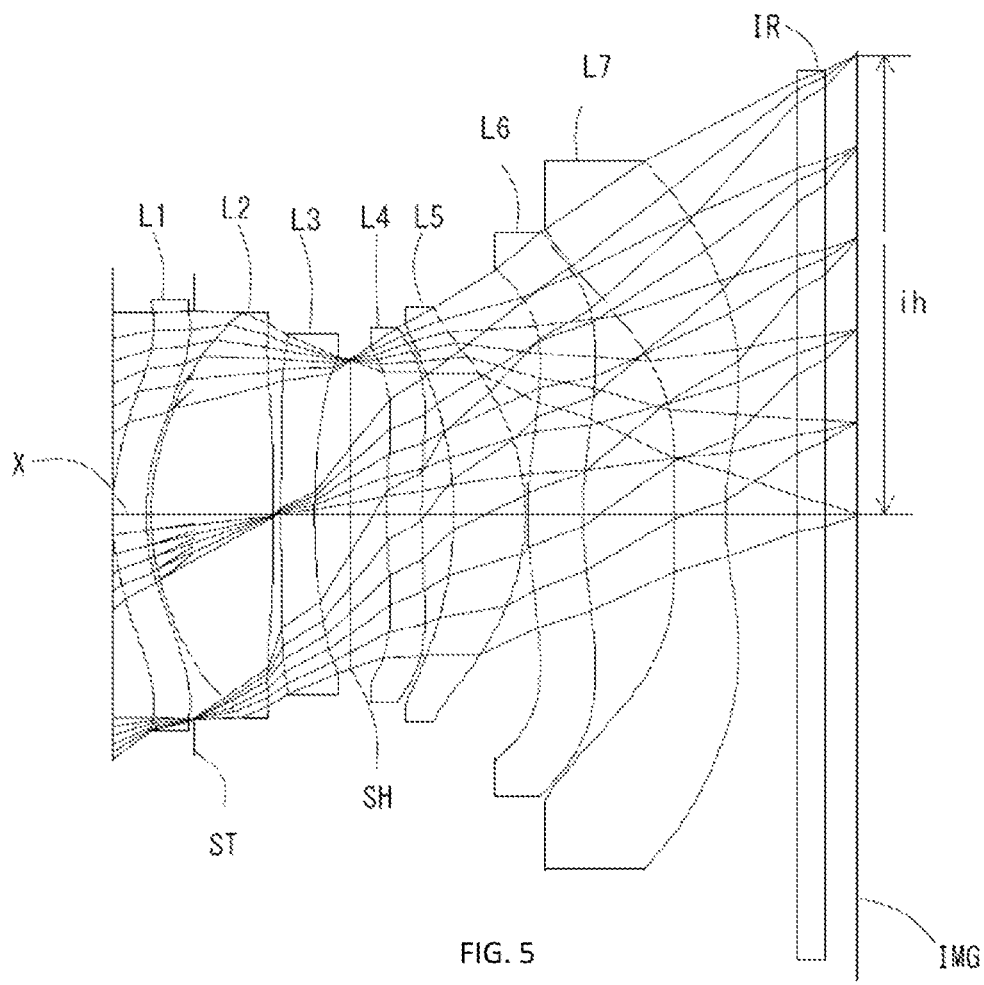
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3

Unit mm $f = 4.25$
$Fno = 1.48$
$\omega(°) = 37.2$
$ih = 3.28$
$TTL = 5.20$

Surface Data

| i | r | d | Nd | vd |
|---|---|---|---|---|
| (Object) | Infinity | Infinity | | |
| 1* | 1.8260 | 0.2400 | 1.650 | 21.54 (vd1) |
| 2* | 1.5053 | 0.3360 | | |
| 3 (Stop) | Infinity | −0.3000 | | |
| 4* | 1.7413 | 0.8596 | 1.544 | 55.57 (vd2) |
| 5* | 59.7949 | 0.0565 | | |
| 6* | 6.9209 | 0.2400 | 1.671 | 19.24 (vd3) |
| 7* | 4.2250 | 0.2500 | | |
| 8 | Infinity | 0.2650 | | |
| 9* | 4.6022 | 0.2400 | 1.671 | 19.24 (vd4) |
| 10* | 4.7826 | 0.2342 | | |
| 11* | −2.5582 | 0.5006 | 1.544 | 55.57 (vd5) |
| 12* | −1.7368 | 0.0215 | | |
| 13* | 2.9280 | 0.3904 | 1.650 | 21.54 (vd6) |
| 14* | 3.1159 | 0.6441 | | |
| 15* | 9.3164 | 0.3656 | 1.584 | 30.10 (vd7) |
| 16* | 2.0114 | 0.5000 | | |
| 17 | Infinity | 0.2100 | 1.517 | 64.20 |
| 18 | Infinity | 0.2183 | | |

Image Plane

Constituent Lens Data

| Lens | Start Surface | Focal Length | Composite Focal Length | | Sag at Peripheral Area of Effective Diameter | |
|---|---|---|---|---|---|---|
| 1 | 1 | −18.696 | f123 | 5.170 | Sag2F | 0.646 |
| 2 | 4 | 3.281 | Entrance Pupil Diameter | | Sag3R | 0.173 |
| 3 | 6 | −16.770 | EPD | 2.870 | Sag4F | −0.125 |
| 4 | 9 | 118.587 | Back Focus | | | |
| 5 | 11 | 8.189 | Bf | 0.857 | | |
| 6 | 13 | 41.050 | | | | |
| 7 | 15 | −4.477 | | | | |

Aspheric Surface Data

| | First Surface | Second Surface | Fourth Surface | Fifth Surface | Sixth Surface | Seventh Surface | Ninth Surface |
|---|---|---|---|---|---|---|---|
| k | −1.169698E+00 | −1.447774E+00 | −5.374961E−01 | −9.000000E+01 | −9.000000E+01 | −7.629088E+01 | −2.606205E+00 |
| A4 | −2.916211E−02 | −5.084594E−02 | −2.316704E−02 | −1.460024E−01 | −1.744514E−01 | 1.897558E−02 | −1.504916E−01 |
| A6 | −2.642815E−02 | −4.469231E−02 | −3.237595E−02 | 1.875426E−01 | 2.740683E−01 | 3.746990E−03 | 1.241283E−01 |
| A8 | 2.956082E−02 | 6.548798E−02 | 5.719010E−02 | −1.177523E−01 | −1.789730E−01 | 7.621230E−02 | −2.238839E−01 |
| A10 | −2.854403E−02 | −5.418029E−02 | −2.799258E−02 | 4.221726E−02 | 3.773573E−02 | −9.845160E−02 | 1.855278E−01 |
| A12 | 1.124099E−02 | 2.031199E−02 | 5.027833E−03 | −7.536024E−03 | 1.349325E−02 | 5.042907E−02 | −7.715605E−02 |
| A14 | −1.508383E−03 | −2.761904E−03 | 0.000000E+00 | 4.573189E−04 | −5.547770E−03 | −6.301311E−03 | 6.318477E−03 |
| A16 | 0.000000E+00 | 0.000000E+00 | 0.000000E+00 | 0.000000E+00 | 0.000000E+00 | 0.000000E+00 | 4.557865E−03 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | −2.917419E−01 | −1.212163E+01 | −1.102151E+00 | −3.780939E+01 | −2.721313E+01 | 1.588483E+00 | −8.126166E+00 |
| A4 | −1.258073E−01 | −8.121662E−02 | −1.039058E−01 | 3.074194E−02 | 1.299202E−02 | −2.523050E−01 | −1.454662E−01 |
| A6 | 6.383375E−02 | 7.875334E−02 | 2.199992E−01 | −9.459426E−02 | −7.435829E−02 | 1.019280E−01 | 6.810180E−02 |
| A8 | −6.311258E−02 | −8.252795E−02 | −3.423132E−01 | 6.833563E−02 | 5.765327E−02 | −3.239030E−02 | −2.297676E−02 |

TABLE 3-continued

Example 3

| | | | | | | | |
|---|---|---|---|---|---|---|---|
| A10 | −4.194040E−03 | 4.541785E−02 | 3.051581E−01 | −2.675670E−02 | −2.477700E−02 | 8.840100E−03 | 5.105256E−03 |
| A12 | 3.405163E−02 | −8.604213E−03 | −1.518781E−01 | 4.465118E−03 | 5.722519E−03 | −1.584331E−03 | −6.834556E−04 |
| A14 | −1.844734E−02 | 0.000000E+00 | 4.032205E−02 | −1.874998E−04 | −6.632303E−04 | 1.551362E−04 | 4.893690E−05 |
| A16 | 3.489137E−03 | 0.000000E+00 | −4.410437E−03 | −5.948036E−06 | 3.057570E−05 | −6.346097E−06 | −1.429997E−06 |

The imaging lens in Example 3 satisfies conditional expressions (2) to (8), and (10) to (26) as shown in Table 8.

Figure 6:
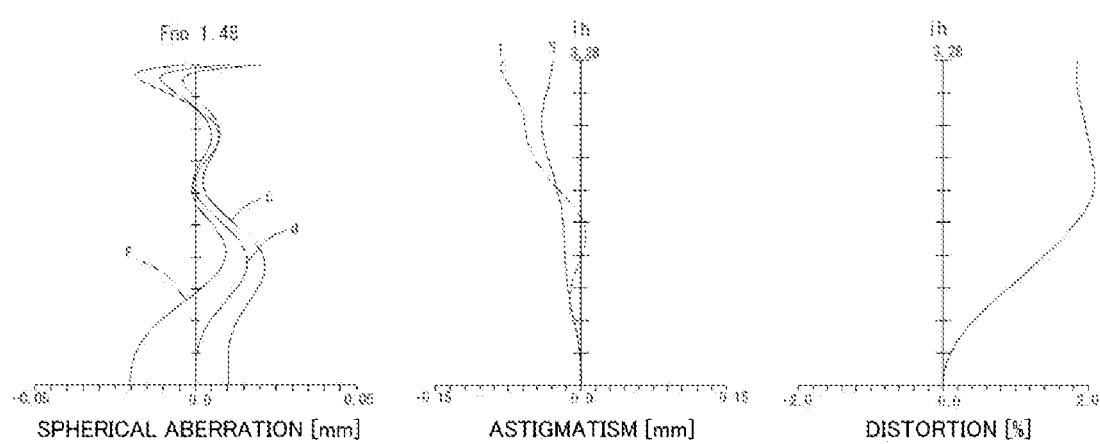
FIG. 6 shows spherical aberration, astigmatism, and distortion of the imaging lens in Example 3 according to the present invention.
Figure 7:
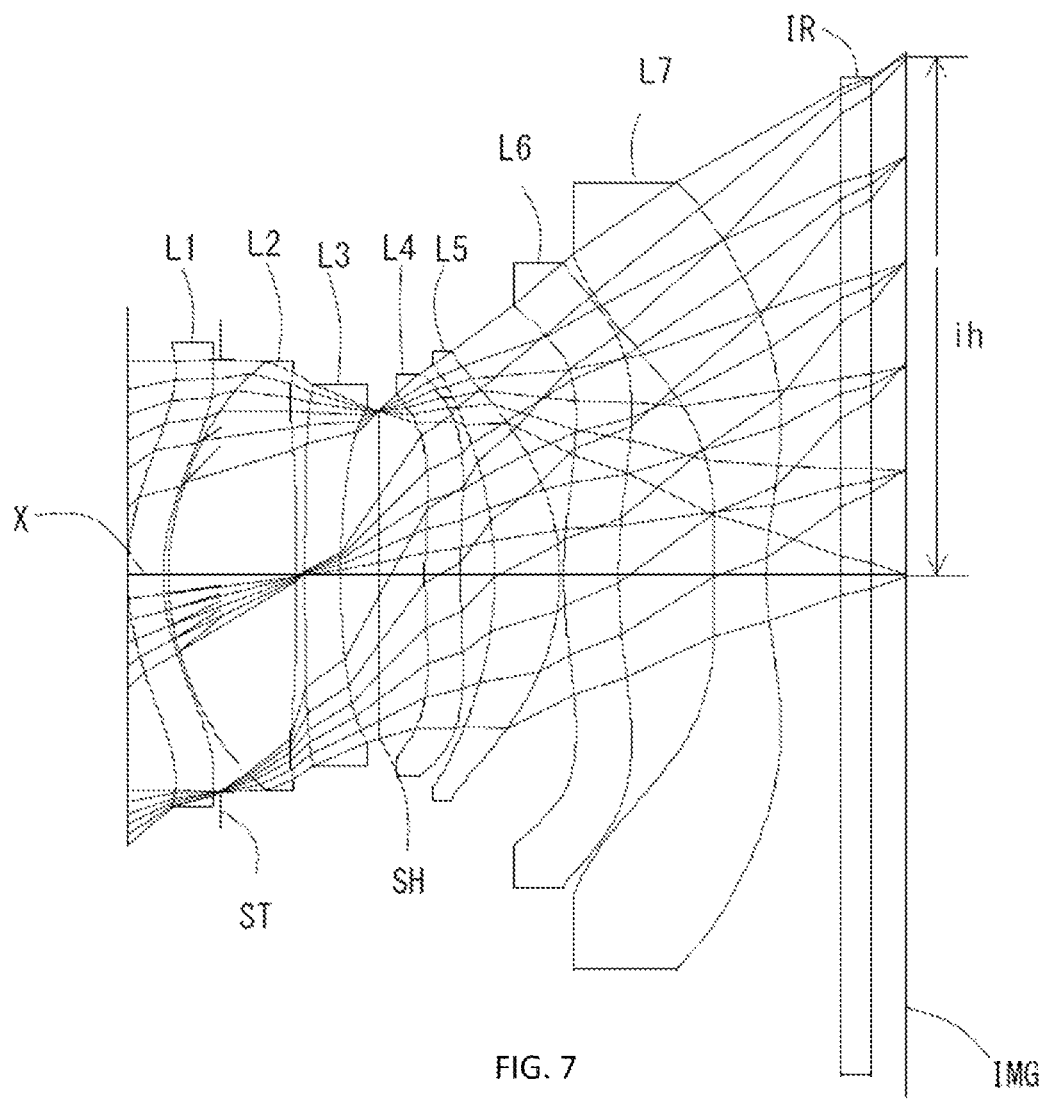
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm f = 4.25
Fno = 1.47
ω(°) = 39.1
ih = 3.53
TTL = 5.17

Surface Data

| i (Object) | r | d | Nd | vd |
|---|---|---|---|---|
| | Infinity | Infinity | | |
| 1* | 1.7322 | 0.2400 | 1.650 | 21.54 (vd1) |
| 2* | 1.4248 | 0.3850 | | |
| 3 (Stop) | Infinity | −0.3500 | | |
| 4* | 1.7448 | 0.8601 | 1.544 | 55.57 (vd2) |
| 5* | 49.1586 | 0.0552 | | |
| 6* | 6.7059 | 0.2400 | 1.671 | 19.24 (vd3) |
| 7* | 4.2849 | 0.2600 | | |
| 8 | Infinity | 0.3115 | | |
| 9* | 5.6525 | 0.2400 | 1.671 | 19.24 (vd4) |
| 10* | 5.8321 | 0.2276 | | |
| 11* | −2.5700 | 0.4406 | 1.544 | 55.57 (vd5) |
| 12* | −1.7007 | 0.0249 | | |
| 13* | 3.0495 | 0.3698 | 1.650 | 21.54 (vd6) |
| 14* | 3.4639 | 0.6418 | | |
| 15* | 13.0684 | 0.3516 | 1.544 | 55.57 (vd7) |
| 16* | 1.9392 | 0.5000 | | |
| 17 | Infinity | 0.2100 | 1.517 | 64.20 |
| 18 | Infinity | 0.2333 | | |

Image Plane
Constituent Lens Data

| Lens | Start Surface | Focal Length | Composite Focal Length | | Sag at Peripheral Area of Effective Diameter | |
|---|---|---|---|---|---|---|
| 1 | 1 | −17.830 | f123 | 5.212 | Sag2F | 0.660 |
| 2 | 4 | 3.305 | Entrance Pupil Diameter | | Sag3R | 0.187 |
| 3 | 6 | −18.428 | EPD | 2.892 | Sag4F | −0.192 |
| 4 | 9 | 178.067 | Back Focus | | | |
| 5 | 11 | 7.845 | Bf | 0.872 | | |
| 6 | 13 | 28.997 | | | | |
| 7 | 15 | −4.234 | | | | |

Aspheric Surface Data

| | First Surface | Second Surface | Fourth Surface | Fifth Surface | Sixth Surface | Seventh Surface | Ninth Surface |
|---|---|---|---|---|---|---|---|
| k | −1.169617E+00 | −1.440092E+00 | −5.343969E−01 | −9.000000E+01 | −9.000000E+01 | −6.840627E+01 | −4.109930E+00 |
| A4 | −2.920082E−02 | −5.065954E−02 | −2.313812E−02 | −1.464731E−01 | −1.734249E−01 | 2.010622E−02 | −1.517067E−01 |
| A6 | −2.646636E−02 | −4.463808E−02 | −3.227840E−02 | 1.874526E−01 | 2.740077E−01 | 4.681424E−03 | 1.229672E−01 |
| A8 | 2.955716E−02 | 6.550671E−02 | 5.723221E−02 | −1.177580E−01 | −1.790364E−01 | 7.684808E−02 | −2.247065E−01 |
| A10 | −2.854058E−02 | −5.416895E−02 | −2.798194E−02 | 4.221809E−02 | 3.770935E−02 | −9.807015E−02 | 1.849384E−01 |

TABLE 4-continued

| | | | Example 4 | | | | |
|---|---|---|---|---|---|---|---|
| A12 | 1.124635E−02 | 2.031825E−02 | 5.029130E−03 | −7.533961E−03 | 1.348650E−02 | 5.062676E−02 | −7.757440E−02 |
| A14 | −1.502903E−03 | −2.758358E−03 | 0.000000E+00 | 4.580688E−04 | −5.546684E−03 | −6.214777E−03 | 6.126011E−03 |
| A16 | 0.000000E+00 | 0.000000E+00 | 0.000000E+00 | 0.000000E+00 | 0.000000E+00 | 0.000000E+00 | 4.608985E−03 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | −1.032978E+00 | −1.308324E+01 | −1.033795E+00 | −3.430436E+01 | −2.240225E+01 | 1.541335E+01 | −7.653550E+00 |
| A4 | −1.267171E−01 | −8.026625E−02 | −1.049964E−01 | 3.026791E−02 | 1.287661E−02 | −2.488695E−01 | −1.424096E−01 |
| A6 | 6.317504E−02 | 7.833934E−02 | 2.191350E−01 | −9.540884E−02 | −7.473049E−02 | 1.024526E−01 | 6.783420E−02 |
| A8 | −6.360875E−02 | −8.295078E−02 | −3.425971E−01 | 6.819605E−02 | 5.769516E−02 | −3.240350E−02 | −2.298280E−02 |
| A10 | −4.444152E−03 | 4.494801E−02 | 3.050936E−01 | −2.673413E−02 | −2.477700E−02 | 8.840100E−03 | 5.106979E−03 |
| A12 | 3.392456E−02 | −8.940110E−03 | −1.518859E−01 | 4.477604E−03 | 5.724534E−03 | −1.587101E−03 | −6.832286E−04 |
| A14 | −1.857417E−02 | 0.000000E+00 | 4.031415E−02 | −1.846410E−04 | −6.630462E−04 | 1.549099E−04 | 4.895172E−05 |
| A16 | 3.331079E−03 | 0.000000E+00 | −4.421961E−03 | −6.135129E−06 | 3.057115E−05 | −6.291312E−06 | −1.429839E−06 |

The imaging lens in Example 4 satisfies conditional expressions (1) to (8), and (10) to (26) as shown in Table 8.

Figure 8:
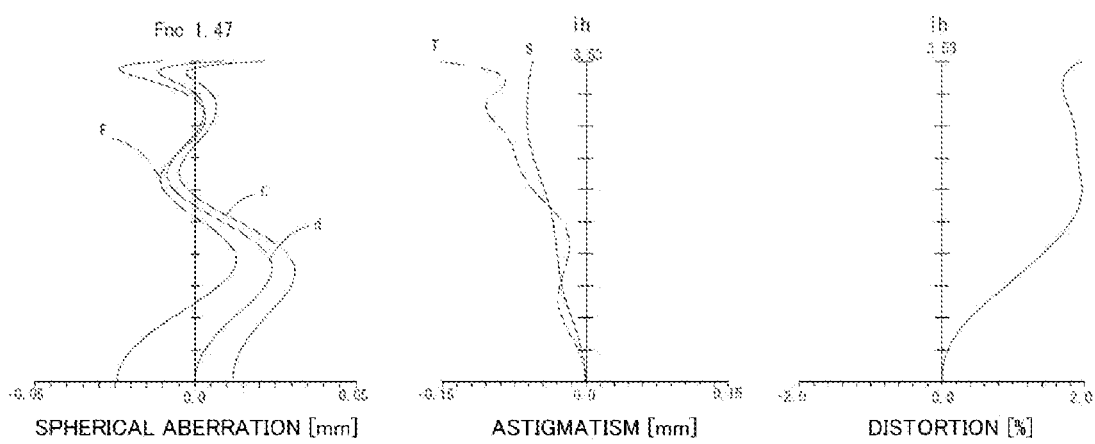
FIG. 8 shows spherical aberration, astigmatism, and distortion of the imaging lens in Example 4 according to the present invention.
Figure 9:
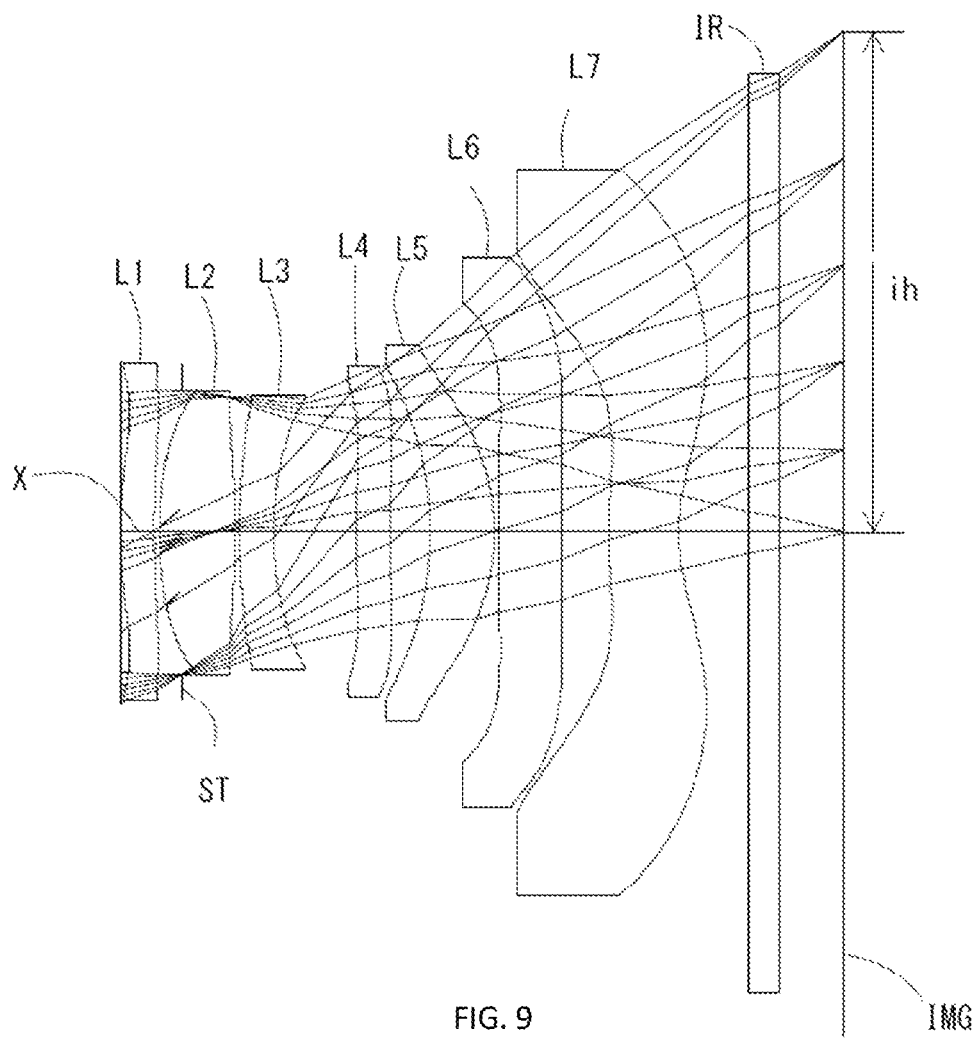
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unit mm f = 4.21
Fno = 2.13
ω(°) = 39.5
ih = 3.53
TTL = 5.01

Surface Data

| i | r | d | Nd | vd |
|---|---|---|---|---|
| (Object) | Infinity | Infinity | | |
| 1* | 2.8601 | 0.2400 | 1.544 | 55.57 (vd1) |
| 2* | 9.8706 | 0.1900 | | |
| 3 (Stop) | Infinity | −0.1500 | | |
| 4* | 4.2527 | 0.5253 | 1.544 | 55.57 (vd2) |
| 5* | −8.0121 | 0.0330 | | |
| 6* | 4.4226 | 0.2400 | 1.671 | 19.24 (vd3) |
| 7* | 2.2934 | 0.5798 | | |
| 8* | 5.9367 | 0.2400 | 1.635 | 23.97 (vd4) |
| 9* | 5.0517 | 0.2821 | | |
| 10* | −2.7123 | 0.4528 | 1.544 | 55.57 (vd5) |
| 11* | −1.5814 | 0.0300 | | |
| 12* | 110.7996 | 0.4422 | 1.650 | 21.54 (vd6) |
| 13* | −386.2523 | 0.3341 | | |
| 14* | 3.2983 | 0.4882 | 1.544 | 55.57 (vd7) |
| 15* | 1.2815 | 0.5000 | | |
| 16 | Infinity | 0.2100 | 1.517 | 64.20 |
| 17 | Infinity | 0.4420 | | |

Image Plane
Constituent Lens Data

| Lens | Start Surface | Focal Length | Composite Focal Length | | Sag at Peripheral Area of Effective Diameter | |
|---|---|---|---|---|---|---|
| 1 | 1 | 7.317 | f123 | 4.617 | Sag2F | 0.255 |
| 2 | 4 | 5.187 | Entrance Pupil Diameter | | Sag3R | 0.241 |
| 3 | 6 | −7.439 | EPD | 1.980 | Sag4F | −0.101 |
| 4 | 8 | −59.652 | Back Focus | | | |
| 5 | 10 | 6.113 | Bf | 1.080 | | |
| 6 | 12 | 132.439 | | | | |
| 7 | 14 | −4.213 | | | | |

TABLE 5-continued

Example 5

Aspheric Surface Data

|   | First Surface | Second Surface | Fourth Surface | Fifth Surface | Sixth Surface | Seventh Surface | Eighth Surface |
|---|---|---|---|---|---|---|---|
| k  | −7.119618E+00 | 0.000000E+00 | 1.323880E+01 | 0.000000E+00 | 0.000000E+00 | −5.770253E+00 | 0.000000E+00 |
| A4 | −7.584260E−02 | 4.212414E−02 | 1.661576E−01 | −2.941222E−01 | −8.855759E−02 | 1.602557E−02 | −1.665600E−01 |
| A6 | −6.039722E−02 | −1.144875E−01 | −8.533486E−02 | 1.400833E−01 | 2.090077E−01 | 6.848954E−02 | 1.561221E−01 |
| A8 | 7.129003E−02 | 6.549679E−02 | 3.093310E−02 | −1.463996E−01 | −2.067023E−01 | 2.667041E−02 | −2.557359E−01 |
| A10 | −4.673708E−02 | −3.958054E−02 | −2.883378E−02 | 6.242907E−02 | 5.009526E−02 | −8.505825E−02 | 2.214793E−01 |
| A12 | 2.077377E−02 | 2.666707E−02 | 9.995412E−03 | −3.192561E−02 | 2.236090E−02 | 3.610562E−02 | −8.311034E−02 |
| A14 | −3.946518E−03 | −7.073556E−03 | 0.000000E+00 | 2.640954E−02 | 6.741982E−04 | 1.763610E−02 | 4.501481E−03 |
| A16 | 0.000000E+00 | 0.000000E+00 | 0.000000E+00 | 0.000000E+00 | 0.000000E+00 | 0.000000E+00 | 2.945119E−03 |

|   | Ninth Surface | Tenth Surface | Eleventh Surface | Twelfth Surface | Thirteenth Surface | Fourteenth Surface | Fifteenth Surface |
|---|---|---|---|---|---|---|---|
| k  | 0.000000E+00 | −2.669948E+00 | −1.376121E+00 | 0.000000E+00 | 0.000000E+00 | −7.901102E−02 | −4.970906E+00 |
| A4 | −1.595458E−01 | −1.142745E−01 | −9.623048E−02 | 7.144468E−02 | 6.203170E−02 | −2.950687E−01 | −1.393296E−01 |
| A6 | 9.965457E−02 | 1.388004E−01 | 1.748223E−01 | −1.250066E−01 | −1.047211E−01 | 1.208786E−01 | 6.486657E−02 |
| A8 | −7.869376E−02 | −1.182545E−01 | −2.981512E−01 | 7.822683E−02 | 6.673987E−02 | −3.649851E−02 | −2.114458E−02 |
| A10 | −1.058780E−02 | 5.291877E−02 | 3.010704E−01 | −2.693368E−02 | −2.477700E−02 | 8.840100E−03 | 4.264996E−03 |
| A12 | 4.657178E−02 | −7.601432E−03 | −1.554546E−01 | 3.510244E−03 | 5.050589E−03 | −1.405462E−03 | −4.984456E−04 |
| A14 | −2.200510E−02 | 0.000000E+00 | 4.003229E−02 | 7.511942E−05 | −5.134509E−04 | 1.207896E−04 | 3.027275E−05 |
| A16 | 3.540119E−03 | 0.000000E+00 | −4.096957E−03 | −3.028343E−05 | 1.995363E−05 | −4.180530E−06 | −7.261609E−07 |

The imaging lens in Example 5 satisfies conditional expressions (1) to (7), and (9) to (26) as shown in Table 8.

Figure 10:
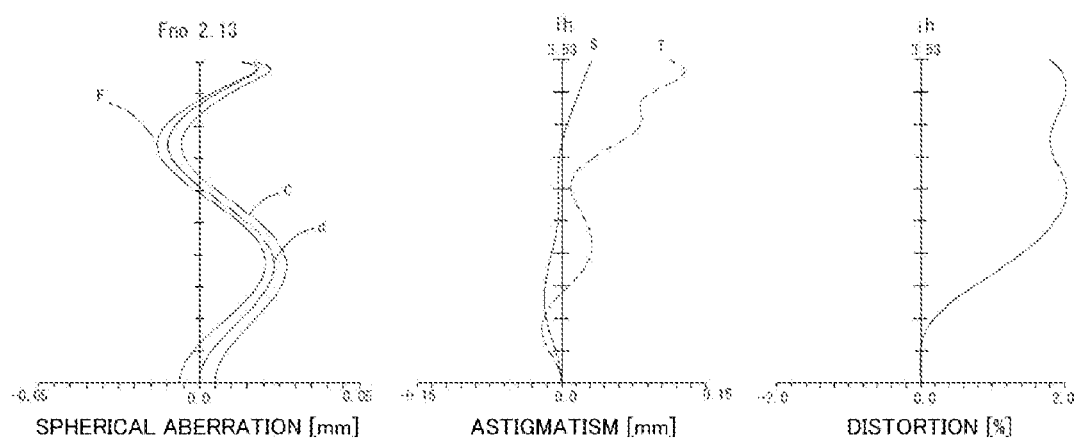
FIG. 10 shows spherical aberration, astigmatism, and distortion of the imaging lens in Example 5 according to the present invention.
Figure 11:
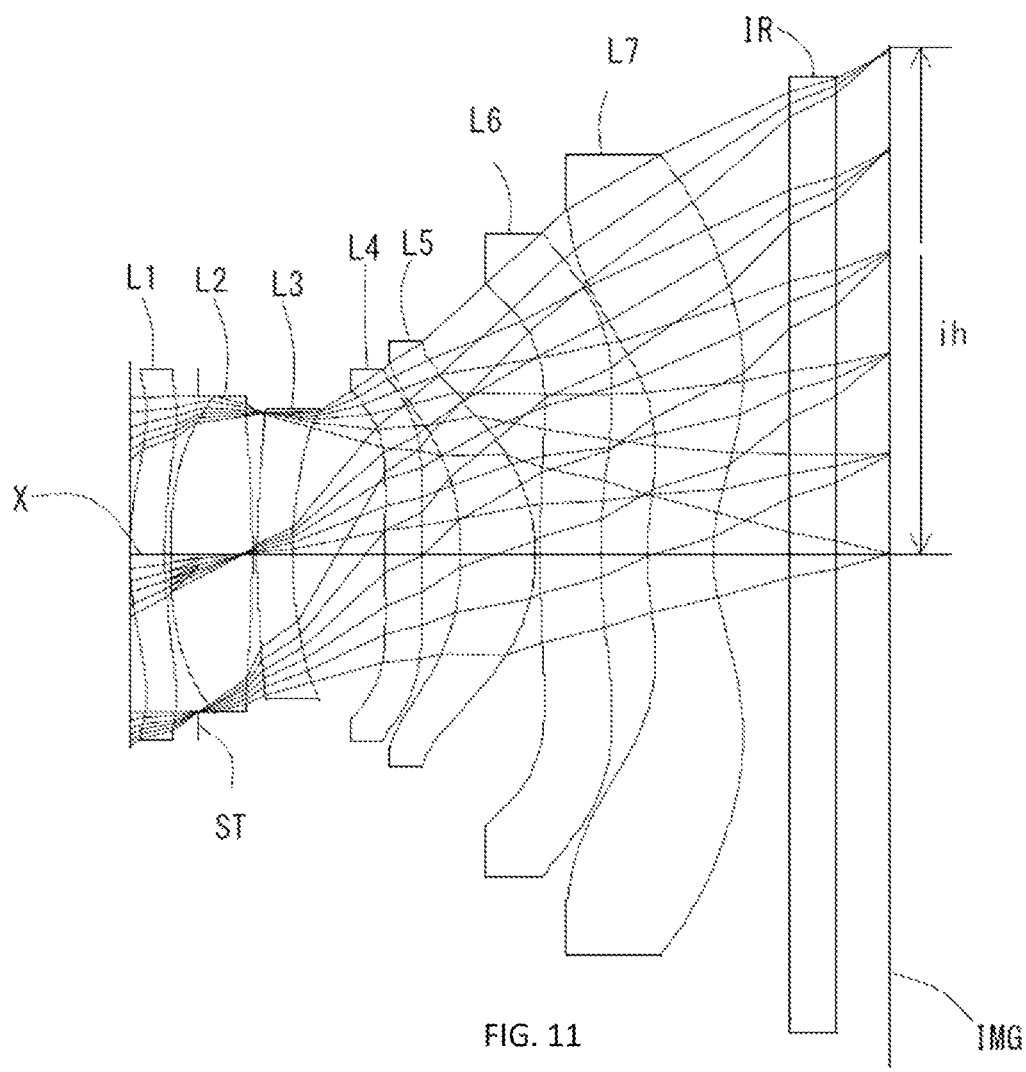
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6

Unit mm f = 3.95
Fno = 1.95
ω(°) = 39.2
ih = 3.28
TTL = 4.82

Surface Data

| i (Object) | r | d | Nd | vd |
|---|---|---|---|---|
|   | Infinity | Infinity |   |   |
| 1* | 2.0861 | 0.2300 | 1.544 | 55.57 (vd1) |
| 2* | 4.3823 | 0.2150 |   |   |
| 3 (Stop) | Infinity | −0.1800 |   |   |
| 4* | 4.4953 | 0.5288 | 1.544 | 55.57 (vd2) |
| 5* | −11.2194 | 0.0300 |   |   |
| 6* | 4.2014 | 0.2300 | 1.671 | 19.24 (vd3) |
| 7* | 2.5630 | 0.5996 |   |   |
| 8* | 8.8589 | 0.2300 | 1.635 | 23.97 (vd4) |
| 9* | 6.4305 | 0.2576 |   |   |
| 10* | −2.2858 | 0.4867 | 1.544 | 55.57 (vd5) |
| 11* | −1.1791 | 0.0300 |   |   |
| 12* | 16.7895 | 0.3914 | 1.650 | 21.54 (vd6) |
| 13* | 4.0767 | 0.3021 |   |   |
| 14* | 2.0103 | 0.4216 | 1.544 | 55.57 (vd7) |
| 15* | 1.1612 | 0.5000 |   |   |
| 16 | Infinity | 0.3000 | 1.517 | 64.20 |
| 17 | Infinity | 0.3508 |   |   |

TABLE 6-continued

Example 6

Image Plane
Constituent Lens Data

| Lens | Start Surface | Focal Length | Composite Focal Length | | Sag at Peripheral Area of Effective Diameter | |
|---|---|---|---|---|---|---|
| 1 | 1 | 7.072 | f123 | 4.401 | Sag2F | 0.281 |
| 2 | 4 | 5.972 | Entrance Pupil Diameter | | Sag3R | 0.174 |
| 3 | 6 | −10.384 | EPD | 2.030 | Sag4F | −0.217 |
| 4 | 8 | −38.356 | Back Focus | | | |
| 5 | 10 | 3.877 | Bf | 1.049 | | |
| 6 | 12 | −8.380 | | | | |
| 7 | 14 | −6.128 | | | | |

Aspheric Surface Data

| | First Surface | Second Surface | Fourth Surface | Fifth Surface | Sixth Surface | Seventh Surface | Eighth Surface |
|---|---|---|---|---|---|---|---|
| k | −1.325570E+00 | 1.021003E+01 | 1.682178E+00 | −9.000000E+01 | −9.000000E+01 | −2.378685E+01 | −9.000000E+01 |
| A4 | −7.607523E−02 | 5.511755E−02 | 2.242776E−01 | −1.264395E−01 | −1.219037E−01 | 3.910358E−02 | −2.146212E−01 |
| A6 | −1.115202E−01 | −1.675738E−01 | −1.150034E−01 | 3.143241E−01 | 3.035222E−01 | 2.438919E−02 | 2.082477E−01 |
| A8 | 9.944236E−02 | 5.919443E−02 | 5.470542E−02 | −3.234696E−01 | −2.935915E−01 | 3.943383E−02 | −4.513044E−01 |
| A10 | −8.105950E−02 | −7.097763E−02 | −3.088720E−02 | 1.674358E−01 | 7.662877E−02 | −5.938673E−02 | 4.246218E−01 |
| A12 | 4.868705E−02 | 7.689552E−02 | 1.448619E−02 | −3.737757E−02 | 8.243988E−02 | 5.431486E−02 | −2.195569E−01 |
| A14 | −1.107029E−02 | −2.470556E−02 | 0.000000E+00 | 2.319833E−03 | −4.797004E−02 | −8.145185E−03 | −2.395769E−03 |
| A16 | 0.000000E+00 | 0.000000E+00 | 0.000000E+00 | 0.000000E+00 | 0.000000E+00 | 0.000000E+00 | 4.591035E−02 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −9.000000E+01 | 1.326598E+00 | −5.740041E−01 | −9.000000E+01 | 1.164227E+00 | −4.094812E−01 | −3.915430E+00 |
| A4 | −2.144783E−01 | −2.727261E−01 | −1.116849E−01 | 8.980753E−02 | 6.465098E−04 | −3.757027E−01 | −1.976467E−01 |
| A6 | 1.473280E−01 | 2.773950E−01 | 3.124029E−01 | −1.745250E−01 | −1.205190E−01 | 1.628997E−01 | 1.080665E−01 |
| A8 | −1.153498E−01 | −1.588187E−01 | −5.663949E−01 | 1.269481E−01 | 1.045154E−01 | −5.634371E−02 | −4.139728E−02 |
| A10 | −3.602785E−02 | 9.043903E−02 | 6.061716E−01 | −5.027263E−02 | −4.761044E−02 | 1.698676E−02 | 1.043266E−02 |
| A12 | 8.648030E−02 | −2.116251E−02 | −3.366827E−01 | 8.130762E−03 | 1.177519E−02 | −3.505843E−03 | −1.595351E−03 |
| A14 | −5.083694E−02 | 0.000000E+00 | 9.876395E−02 | 5.043684E−06 | −1.485512E−03 | 3.972126E−04 | 1.323435E−04 |
| A16 | 1.544486E−02 | 0.000000E+00 | −1.239195E−02 | −7.749420E−05 | 7.497118E−05 | −1.856056E−05 | −4.547186E−06 |

The imaging lens in Example 6 satisfies conditional expressions (1) to (7), and (9) to (26) as shown in Table 8.

Figure 12:
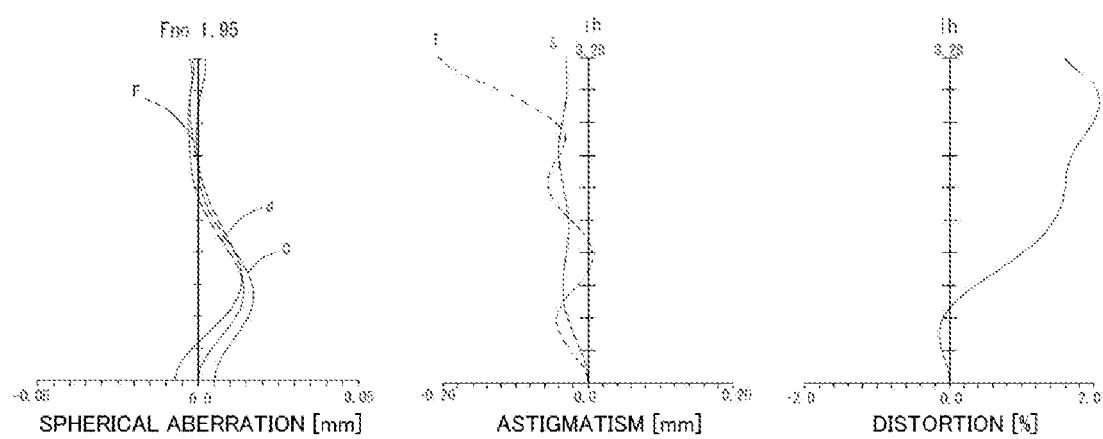
FIG. 12 shows spherical aberration, astigmatism, and distortion of the imaging lens in Example 6 according to the present invention.
Figure 13:
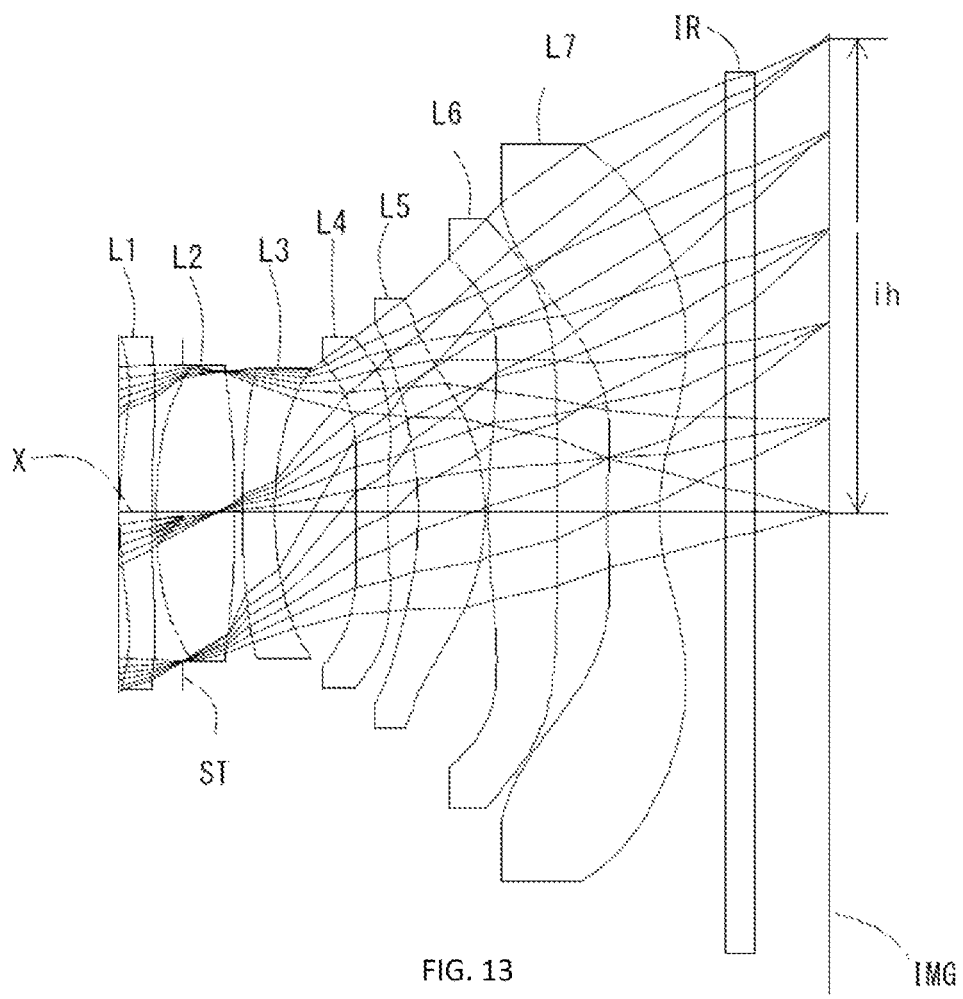
FIG. 13 is a schematic view showing an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example 7

Unit mm f = 4.24
Fno = 1.95
ω(°) = 39.3
ih = 3.53
TTL = 5.21

Surface Data

| i (Object) | r Infinity | d Infinity | Nd | vd |
|---|---|---|---|---|
| 1* | 2.9294 | 0.2400 | 1.544 | 55.57 (vd1) |
| 2* | 14.3304 | 0.2400 | | |
| 3 (Stop) | Infinity | −0.2000 | | |
| 4* | 5.3991 | 0.5852 | 1.544 | 55.57 (vd2) |
| 5* | −7.7527 | 0.0516 | | |
| 6* | 5.2998 | 0.2400 | 1.671 | 19.24 (vd3) |
| 7* | 2.6277 | 0.5998 | | |
| 8* | 7.6345 | 0.2400 | 1.635 | 23.97 (vd4) |
| 9* | 3.8501 | 0.2278 | | |

TABLE 7-continued

Example 7

| | | | | |
|---|---|---|---|---|
| 10* | −2.8903 | 0.4936 | 1.544 | 55.57 (vd5) |
| 11* | −1.8789 | 0.0294 | | |
| 12* | 5.4624 | 0.5070 | 1.650 | 21.54 (vd6) |
| 13* | −27.6093 | 0.3737 | | |
| 14* | 3.6274 | 0.3842 | 1.544 | 55.57 (vd7) |
| 15* | 1.2986 | 0.5000 | | |
| 16 | Infinity | 0.2100 | 1.517 | 64.20 |
| 17 | Infinity | 0.5561 | | |

Image Plane

Constituent Lens Data

| Lens | Start Surface | Focal Length | Composite Focal Length | | Sag at Peripheral Area of Effective Diameter | |
|---|---|---|---|---|---|---|
| 1 | 1 | 6.721 | f123 | 4.712 | Sag2F | 0.264 |
| 2 | 4 | 5.946 | Entrance Pupil Diameter | | Sag3R | 0.266 |
| 3 | 6 | −8.061 | EPD | 2.172 | Sag4F | −0.237 |
| 4 | 8 | −12.541 | Back Focus | | | |
| 5 | 10 | 8.426 | Bf | 1.195 | | |
| 6 | 12 | 7.055 | | | | |
| 7 | 14 | −3.949 | | | | |

Aspheric Surface Data

| | First Surface | Second Surface | Fourth Surface | Fifth Surface | Sixth Surface | Seventh Surface | Eighth Surface |
|---|---|---|---|---|---|---|---|
| k | −1.273506E+00 | 2.293730E+01 | 7.610019E+00 | −9.000000E+01 | −9.000000E+01 | −8.406196E+00 | −9.000000E+00 |
| A4 | −6.363624E−02 | 6.395370E−02 | 1.583868E−01 | −8.052199E−02 | −3.766954E−02 | 1.340122E−02 | −2.714333E−01 |
| A6 | −6.683423E−02 | −1.102739E−01 | −7.843706E−02 | 1.560128E−01 | 1.642708E−01 | 6.948911E−02 | 2.395019E−01 |
| A8 | 6.105317E−02 | 5.675269E−02 | 3.548401E−02 | −1.515987E−01 | −1.692029E−01 | −4.433202E−03 | −3.133936E−01 |
| A10 | −4.374363E−02 | −4.173640E−02 | −2.201527E−02 | 6.902394E−02 | 6.637171E−02 | −6.131743E−02 | 2.068784E−01 |
| A12 | 2.183071E−02 | 2.757658E−02 | 8.634796E−03 | −1.065006E−02 | 1.164281E−02 | 6.689665E−02 | −6.891839E−02 |
| A14 | −4.205314E−03 | −6.369764E−03 | 0.000000E+00 | 2.588401E−04 | −1.149606E−02 | −2.002134E−02 | 1.490099E−02 |
| A16 | 0.000000E+00 | 0.000000E+00 | 0.000000E+00 | 0.000000E+00 | 0.000000E+00 | 0.000000E+00 | −8.226120E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −9.000000E+01 | −7.594036E+00 | −7.301365E−01 | −9.000000E+01 | 0.000000E+00 | 2.266493E−01 | −4.739544E+00 |
| A4 | −1.432187E−01 | −8.265673E−02 | −1.247012E−01 | 5.147731E−02 | 6.318201E−02 | −2.859274E−01 | −1.405820E−01 |
| A6 | 7.670918E−02 | 1.476087E−01 | 2.317471E−01 | −1.035505E−01 | −1.009130E−01 | 1.175140E−01 | 6.544975E−02 |
| A8 | −6.386294E−02 | −1.191639E−01 | −3.403285E−01 | 7.204063E−02 | 6.643314E−02 | −3.609630E−02 | −2.119600E−02 |
| A10 | −1.388687E−02 | 4.699863E−02 | 3.226701E−01 | −2.640183E−02 | −2.477700E−02 | 8.840100E−03 | 4.272165E−03 |
| A12 | 4.042592E−02 | −7.892246E−03 | −1.616946E−01 | 3.901291E−03 | 4.973245E−03 | −1.404180E−03 | −4.984558E−04 |
| A14 | −2.215490E−02 | 0.000000E+00 | 4.043754E−02 | 4.237071E−05 | −4.908903E−04 | 1.203770E−04 | 3.010803E−05 |
| A16 | 5.123618E−03 | 0.000000E+00 | −4.031520E−03 | −4.398359E−05 | 1.819654E−05 | −4.200977E−06 | −7.162801E−07 |

The imaging lens in Example 7 satisfies conditional expressions (1) to (7), and (9) to (26) as shown in Table 8.

Figure 14:
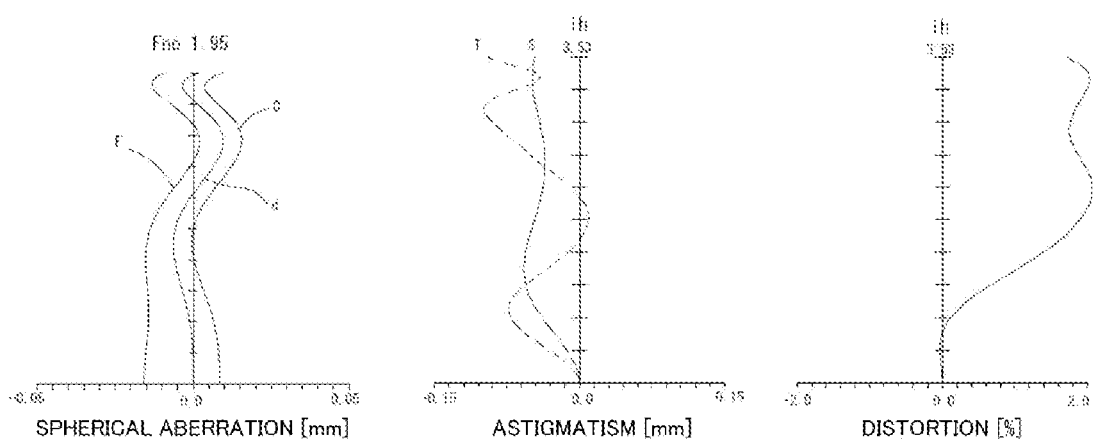
FIG. 14 shows spherical aberration, astigmatism, and distortion of the imaging lens in Example 7 according to the present invention.
Figure 15:
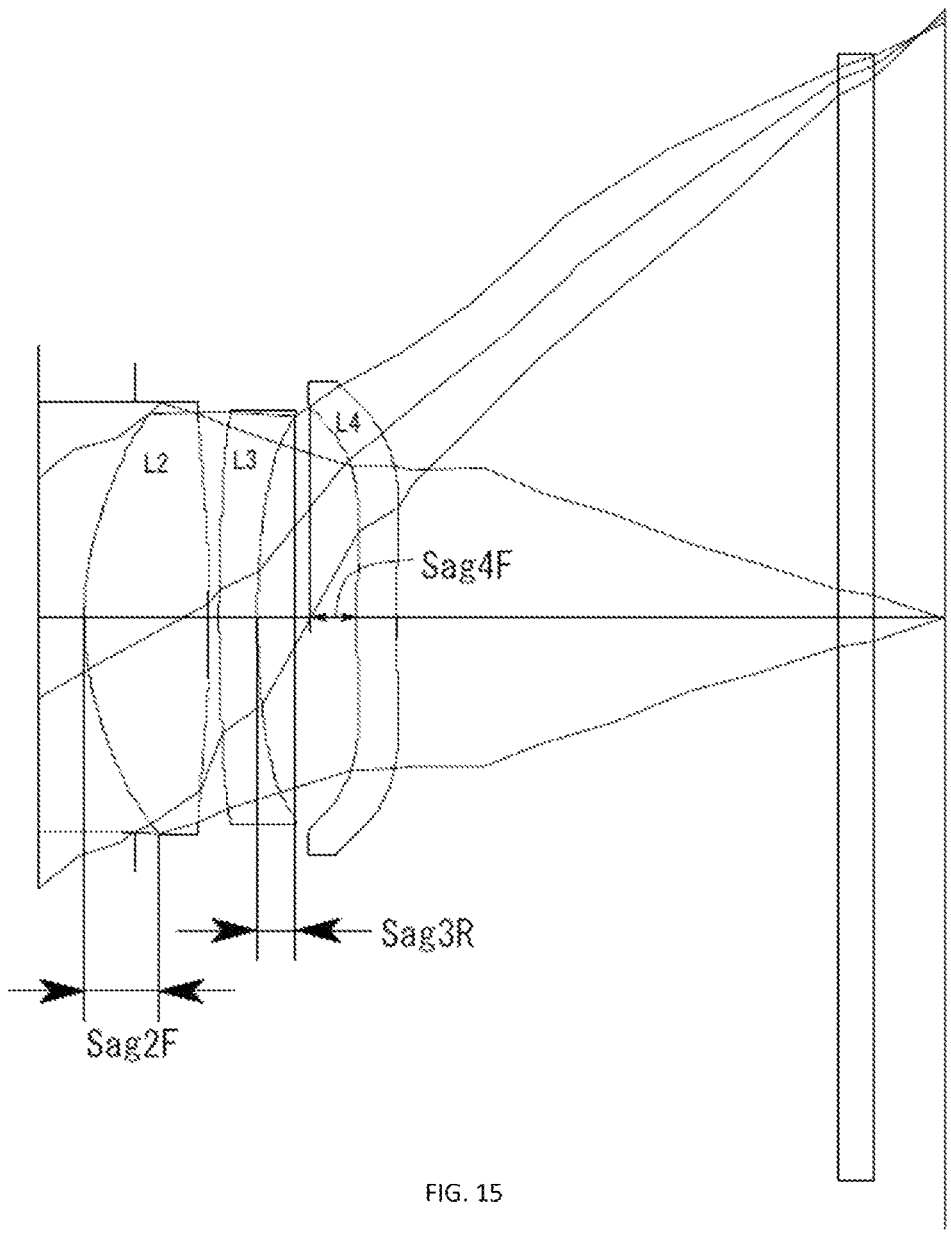
FIG. 15 illustrates an amount of an amount of Sag2F at a peripheral area of the effective diameter on the object-side surface of the second lens, an amount of Sag3R at the peripheral area of the effective diameter on the image-side surface of the third lens, and an amount of Sag4F at the peripheral area of the effective diameter on the object-side surface of the fourth lens according to the imaging lens of the present invention.

FIG. 14 shows spherical aberration (mm), astigmatism (mm), and distortion (%) of the imaging lens in Example 7. As shown in FIG. 14, each aberration is corrected excellently.

In table 8, values of conditional expressions (1) to (26) related to the Examples 1 to 7 are shown.

TABLE 8

| | Conditional Expressions | Example 1 | Example 2 | Example 3 | Example 4 | Example 5 | Example 6 | Example 7 |
|---|---|---|---|---|---|---|---|---|
| (1) | vd7 | 55.57 | 23.97 | 30.10 | 55.57 | 55.57 | 55.57 | 55.57 |
| (2) | TTL/ih | 1.48 | 1.59 | 1.59 | 1.47 | 1.42 | 1.47 | 1.48 |
| (3) | vd5/vd6 | 2.58 | 2.58 | 2.58 | 2.58 | 2.58 | 2.58 | 2.58 |
| (4) | r2/f | 0.34 | 0.36 | 0.35 | 0.34 | 2.34 | 1.11 | 3.38 |
| (5) | r9/f | −0.61 | −0.60 | −0.60 | −0.60 | −0.64 | −0.58 | −0.68 |
| (6) | r14/f | 0.32 | 0.34 | 0.47 | 0.46 | 0.30 | 0.29 | 0.31 |
| (7) | (T1/TTL) × 100 | 0.85 | 0.65 | 0.69 | 0.68 | 0.80 | 0.73 | 0.77 |
| (8), (9) | f1/f | −3.13 | −3.18 | −4.40 | −4.19 | 1.74 | 1.79 | 1.58 |
| (10) | f2/f | 0.70 | 0.72 | 0.77 | 0.78 | 1.23 | 1.51 | 1.40 |
| (11) | f3/f | −3.25 | −3.48 | −3.95 | −4.33 | −1.77 | −2.63 | −1.90 |
| (12) | f5/f | 1.64 | 1.77 | 1.93 | 1.85 | 1.45 | 0.98 | 1.99 |
| (13) | f7/f | −1.17 | −1.18 | −1.05 | −1.00 | −1.00 | −1.55 | −0.93 |
| (14) | r3/r4 | −0.07 | −0.07 | 0.03 | 0.04 | −0.53 | −0.40 | −0.70 |
| (15) | r5/r6 | 1.87 | 1.70 | 1.64 | 1.57 | 1.93 | 1.64 | 2.02 |
| (16) | r9/r10 | 1.57 | 1.50 | 1.47 | 1.51 | 1.72 | 1.94 | 1.54 |

TABLE 8-continued

| Conditional Expressions | | Example 1 | Example 2 | Example 3 | Example 4 | Example 5 | Example 6 | Example 7 |
|---|---|---|---|---|---|---|---|---|
| (17) | r11/r12 | 0.92 | 0.90 | 0.94 | 0.88 | −0.29 | 4.12 | −0.20 |
| (18) | T3/T4 | 2.30 | 2.71 | 2.20 | 2.51 | 2.06 | 2.33 | 2.63 |
| (19) | D1/f | 0.05 | 0.06 | 0.06 | 0.06 | 0.06 | 0.06 | 0.06 |
| (20) | D5/f | 0.12 | 0.15 | 0.12 | 0.10 | 0.11 | 0.12 | 0.12 |
| (21) | D6/f | 0.10 | 0.11 | 0.09 | 0.09 | 0.11 | 0.10 | 0.12 |
| (22) | (Sag2F + Sag3R − Sag4F)/f | 0.23 | 0.18 | 0.22 | 0.24 | 0.14 | 0.17 | 0.18 |
| (23) | TTL/EPD | 2.08 | 2.35 | 1.81 | 1.79 | 2.53 | 2.37 | 2.40 |
| (24) | Bf/TTL | 0.20 | 0.19 | 0.16 | 0.17 | 0.22 | 0.22 | 0.23 |
| (25) | (T1 + T2)/Σd | 0.08 | 0.10 | 0.06 | 0.06 | 0.07 | 0.06 | 0.08 |
| (26) | f123/f | 1.22 | 1.25 | 1.22 | 1.23 | 1.10 | 1.11 | 1.11 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
L7: seventh lens
ih: maximum image height
IR: filter
IMG: imaging plane
SH: flare stop

The invention claimed is:

1. An imaging lens comprising in order from an object side to an image side,
a first lens,
an aperture stop,
a second lens with positive refractive power in a paraxial region,
a third lens with negative refractive power in the paraxial region,
a fourth lens,
a fifth lens with the positive refractive power in the paraxial region,
a sixth lens being a double-sided aspheric lens, and
a seventh lens with negative refractive power having an image-side surface being concave in the paraxial region and an aspheric surface having at least one pole point in a position off the optical axis,
wherein the first lens has the positive refractive power,
the second lens is formed in a biconvex shape having convex object-side and image-side surfaces in the paraxial region,
the fifth lens has a concave object-side surface in the paraxial region,
the sixth lens has a convex object-side surface in the paraxial region,
the seventh lens has a convex object-side surface, and
the following conditional expressions (1) and (7) are satisfied:

$$40 < vd7 < 70 \qquad (1)$$

$$0.50 < (T1/TTL) \times 100 < 1.20 \qquad (7)$$

where
vd7: an abbe number at d-ray of the seventh lens,
T1: a distance along the optical axis from an image-side surface of the first lens to an object-side surface of the second lens, and
TTL: a total track length.

2. The imaging lens according to claim 1, wherein the first lens is formed in a meniscus shape having a convex object-side surface in the paraxial region.

3. The imaging lens according to claim 1, wherein the third lens has a convex object-side surface in the paraxial region.

4. The imaging lens according to claim 1, wherein the object-side surface of the sixth lens has at least one pole point in a position off the optical axis.

5. The imaging lens according to claim 1, wherein the object-side surface of the seventh lens is formed as an aspheric surface having at least one pole point in a position off the optical axis.

6. The imaging lens according to claim 1, wherein the following conditional expression (2) is satisfied:

$$TTL/ih < 2.0 \qquad (2)$$

where
TTL: a total track length, and
Ih: a maximum image height.

* * * * *